United States Patent
McCool et al.

(10) Patent No.: US 11,084,985 B2
(45) Date of Patent: Aug. 10, 2021

(54) BOILING FREE FRACTIONATION OF HYDROCARBON STREAMS UTILIZING A MEMBRANE CASCADE

(71) Applicant: ExxonMobil Research and Engineering Company, Annandale, NJ (US)

(72) Inventors: Benjamin A. McCool, Annandale, NJ (US); Dhaval A. Bhandari, Bridgewater, NJ (US); Yogesh V. Joshi, Annandale, NJ (US)

(73) Assignee: EXXONMOBIL RESEARCH AND ENGINEERING COMPANY, Annandale, NJ (US)

( * ) Notice: Subject to any disclaimer, the term of this patent is extended or adjusted under 35 U.S.C. 154(b) by 184 days.

(21) Appl. No.: 16/423,736

(22) Filed: May 28, 2019

(65) Prior Publication Data

US 2019/0367820 A1    Dec. 5, 2019

Related U.S. Application Data

(60) Provisional application No. 62/679,144, filed on Jun. 1, 2018.

(51) Int. Cl.
*C10G 31/00* (2006.01)
*C10G 31/09* (2006.01)
(Continued)

(52) U.S. Cl.
CPC ............. *C10G 31/00* (2013.01); *B01D 61/02* (2013.01); *B01D 61/022* (2013.01);
(Continued)

(58) Field of Classification Search
CPC .... B01D 61/02; B01D 61/022; B01D 61/025; B01D 61/027; B01D 61/145; B01D 61/147; B01D 61/362; B01D 61/58; B01D 69/02; B01D 2317/022; B01D 2317/025; B01D 2317/08; B01D 2325/20; C10G 31/00; C10G 31/09; C10G 31/11; C10G 53/02; C10G 70/045; C10G 2300/10;
(Continued)

(56) References Cited

U.S. PATENT DOCUMENTS 5,012,036 A    4/1991   Sartori et al.
5,133,867 A    7/1992   LaFreniere
(Continued)

FOREIGN PATENT DOCUMENTS

JP    2014159543 A    9/2014

OTHER PUBLICATIONS

Inessa Burtina, et al. "A membrane technology of separating the basic aviation kerosene from petroleum", Eastern-European Journal of Enterprise Technologies, vol. 4, No. 6(82), Aug. 24, 2016, p. 4-11 (8 pages).

(Continued)

*Primary Examiner* — John Kim
(74) *Attorney, Agent, or Firm* — Robert A. Migliorini

(57) ABSTRACT

Methods and systems are provided herein utilizing a membrane cascade to separate a hydrocarbon feed into boiling point fractions. Also provided herein are methods for selecting membranes for said cascades to achieve the desired boiling point fraction separation.

22 Claims, 13 Drawing Sheets

(51) Int. Cl.
*C10G 53/02* (2006.01)
*C10G 70/04* (2006.01)
*B01D 61/02* (2006.01)
*B01D 61/14* (2006.01)
*B01D 61/36* (2006.01)
*B01D 61/58* (2006.01)
*B01D 69/02* (2006.01)
*C10G 31/11* (2006.01)

(52) U.S. Cl.
CPC ......... *B01D 61/025* (2013.01); *B01D 61/027* (2013.01); *B01D 61/145* (2013.01); *B01D 61/362* (2013.01); *B01D 61/58* (2013.01); *B01D 69/02* (2013.01); *C10G 31/09* (2013.01); *C10G 53/02* (2013.01); *C10G 70/045* (2013.01); B01D 2317/025 (2013.01); B01D 2325/20 (2013.01); C10G 31/11 (2013.01); C10G 2300/10 (2013.01); C10G 2300/1037 (2013.01); C10G 2300/1051 (2013.01); C10G 2300/1055 (2013.01); C10G 2300/1059 (2013.01); C10G 2300/201 (2013.01); C10G 2300/202 (2013.01); C10G 2300/203 (2013.01); C10G 2300/206 (2013.01); C10G 2300/301 (2013.01); C10G 2300/302 (2013.01); C10G 2300/304 (2013.01); C10G 2300/307 (2013.01); C10G 2300/308 (2013.01); C10G 2300/4006 (2013.01); C10G 2300/4012 (2013.01); C10G 2300/4025 (2013.01); C10G 2400/02 (2013.01); C10G 2400/04 (2013.01); C10G 2400/06 (2013.01); C10G 2400/30 (2013.01)

(58) Field of Classification Search
CPC .... C10G 2300/1037; C10G 2300/1051; C10G 2300/1055; C10G 2300/1059; C10G 2300/201; C10G 2300/202; C10G 2300/203; C10G 2300/206; C10G 2300/301; C10G 2300/302; C10G 2300/304; C10G 2300/307; C10G 2300/308; C10G 2300/4006; C10G 2300/4012; C10G 2300/4025; C10G 2400/02; C10G 2400/04; C10G 2400/06; C10G 2400/30

See application file for complete search history.

(56) References Cited

U.S. PATENT DOCUMENTS

| | | |
|---|---|---|
| 5,156,950 A | 10/1992 | Akino et al. |
| 5,180,496 A | 1/1993 | Sartori et al. |
| 5,256,297 A | 10/1993 | Feimer et al. |
| 5,435,918 A | 7/1995 | Welmers et al. |
| 5,670,052 A | 9/1997 | Ho et al. |
| 7,141,171 B2 | 11/2006 | Lightfoot, Jr. |
| 7,351,873 B2 | 4/2008 | Cederlof et al. |
| 7,736,493 B2 | 6/2010 | Leta et al. |
| 7,837,879 B2 | 11/2010 | Leta et al. |
| 7,842,124 B2 | 11/2010 | Partridge et al. |
| 7,867,379 B2 | 1/2011 | Leta et al. |
| 7,871,510 B2 | 1/2011 | Leta et al. |
| 7,897,828 B2 | 3/2011 | Nadler et al. |
| 7,931,798 B2 | 4/2011 | Gorbaty et al. |
| 7,943,037 B2 | 5/2011 | Gorbaty et al. |
| 8,114,678 B2 * | 2/2012 | Chawla ............ G01N 30/96 436/161 |
| 8,119,006 B2 | 2/2012 | Patil et al. |
| 8,152,999 B2 | 4/2012 | Lightfoot, Jr. et al. |
| 8,177,965 B2 | 5/2012 | Leta et al. |
| 8,765,824 B2 | 7/2014 | Shaffer et al. |
| 8,845,886 B2 | 9/2014 | Calabro et al. |
| 8,864,996 B2 | 10/2014 | Leta et al. |
| 2011/0049034 A1 | 3/2011 | Theron et al. |
| 2016/0158703 A1 | 6/2016 | Priske et al. |

OTHER PUBLICATIONS

Partial Search Report issued in related Application No. PCT/US2019/034150, dated Sep. 6, 2019 (19 pages).

* cited by examiner

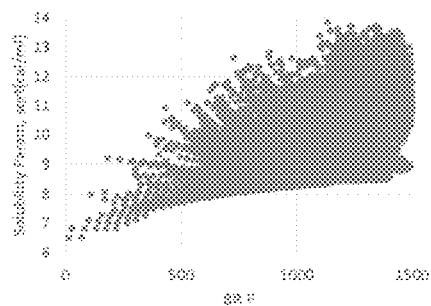
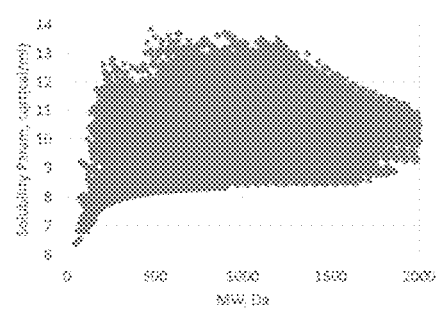
FIG. 14A　　　　　　　　　　FIG. 14B
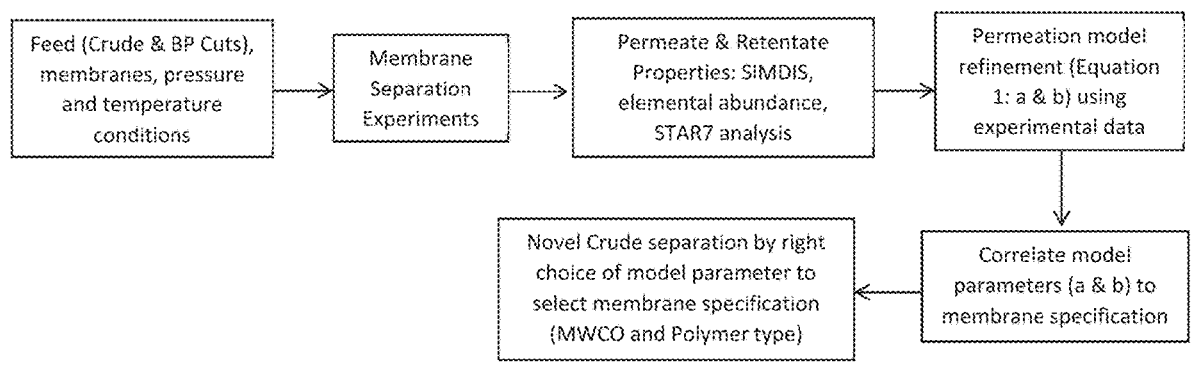
FIG. 15

BOILING FREE FRACTIONATION OF HYDROCARBON STREAMS UTILIZING A MEMBRANE CASCADE

CROSS REFERENCE TO RELATED APPLICATIONS

This application claims priority to U.S. Provisional Application Ser. No. 62/679,144 filed Jun. 1, 2018, which is herein incorporated by reference in its entirety.

FIELD

Systems and methods are provided for boiling free fractionation of hydrocarbon streams utilizing a membrane cascade.

BACKGROUND

A petroleum refinery has conventionally been built around thermal phase change based separation processes with atmospheric and vacuum distillation being the predominant technology. Indeed, in the current state of the art distillation is the cornerstone of all refining processes. So much so that refining streams and downstream processes and products are often designed for and defined in terms of boiling point ranges. In a typical distillation process desalted crude is first fed to an atmospheric and then a vacuum distillation column. Distillation separates based on differences in relative volatility involving phase change and vapor-liquid equilibrium. In other words, the crude oil is heated so that each fraction evaporates or boils and then condenses in its own compartment of the distillation column. Heat is removed from this condensation in the overhead condenser at much lower temperature than the furnace used to add the heat. Such heat is often a waste energy with very little value in terms of heat integration. The product cuts range from low boiling point molecules to high boiling molecules with increasing carbon numbers i.e. light ends ($C_1$-$C_4$) naphtha ($C_5$-$C_{12}$), jet fuel/kerosene ($C_{12}$-$C_{17}$), diesel ($C_{17}$-$C_{35}$), lubes ($C_{35}$-$C_{60}$) and asphalt ($C_{60}$-$C_{200+}$). Distillation consumes significant amounts of energy and has significant carbon and area footprints.

Non-conventional separation systems such as membranes could theoretically perform the same function of conventional atmospheric and distillation columns. But there needs to be an understanding of class and size vs. boiling point relationship for these separation systems to be a viable alternative to distillation and preserve the type of product cuts on which the existing petrochemical processing and transportation infrastructure is built.

It would be advantageous to fractionate whole crude and/or its various components into conventional distillate fractions without the requirement for a thermal phase change—i.e. without boiling. Provided herein are systems and methods utilizing non-phase change based separation media such as membrane based systems in a cascade configuration to fractionate whole crude and/or its various components into petroleum refining products. This concept potentially replaces atmospheric and vacuum distillation processes at the front end of a refinery and greatly simplifies downstream conversion processes such as isomerization, reforming, catalytic heteroatom removal by partitioning the molecules into their appropriate class and size in a non-phase change separation process vs. phase changed based distillation. The principles disclosed herein can also be used in other large refinery conversion units, such as a coker or fluid catalytic cracking units which have a significant distillation based separation footprint with the main fractionator distilling products from FCC and delayed coker into end products of cracked petroleum naphtha, gas oil, and offgas.

Separation of heavy hydrocarbon streams with ultrafiltration is described in the prior art, such as in U.S. Pat. Nos. 7,736,493; 7,837,879; 7,867,379; 7,871,510; 7,897,828; 7,931,798; 7,943,037 and 8,177,965, 8,845,886 and 8,864,996, all of which are incorporated by reference. The focus of these patents has been mostly on metals, micro-carbon residue (MCR), asphaltenes rejection, and saturates or paraffin enrichment. The type of feeds considered in these patents range from crude (whole, topped, synthetic, shale based, bitumen or tar sands based) to steam cracker tar, atmospheric or vacuum pipestill resid. The range of applications considered are heavy oil upgrading, fluid catalytic cracker (FCC) feed upgrading, deasphalter debottleneck, vacuum pipestill debottleneck, steam cracker tar upgrading, upgrade of visbroken residua, asphalt production, and enhanced coker feed preparation. U.S. Pat. No. 7,351,873 discusses removal of color bodies and/or asphalthenic contaminants from a liquid hydrocarbon mixture. U.S. Pat. No. 5,256,297 discusses a two-stage membrane process for MCR, metals and asphaltene removal from heavy hydrocarbon feed where the permeate from the first membrane stage is fed to a second membrane stage to enable better separation in preparation for FCC feed. U.S. Publication No. 2016/0158703 describes a membrane cascade for Rh catalyst recovery from homogeneously catalyzed mixtures for hydroformylation process. U.S. Publication No. 2011/0049034 describe a modular cross flow filtration system with multiple stages of filtration. U.S. Pat. No. 6,156,950 describes a permeation separation and or adsorption based process to separate straight and mono-branched $C_5$-$C_8$ paraffins from a $C_{7+}$ hydrocarbon stream with preferential rejection of multi-branched paraffins with optional rejection of naphthenic and aromatic species. The use of eluent for regenerating said adsorption unit or a flushing gas for regenerating said permeation separation unit is also described.

While these patents discuss the use of liquid hydrocarbon streams, the use of a cascade type system, and the removal of certain molecule types, none of them describe the use of a cascade to replace an atmospheric/vacuum distillation. Whole crude and crude fractions contain several thousand molecular species that require detailed understanding of molecular class and size with respect to boiling point. This understanding has enabled us to demonstrate these new separation systems while maintaining the same type of products from conventional distillation.

SUMMARY

Provided herein are processes and systems for boiling-free separation of a hydrocarbon stream into boiling point fractions through use of a membrane cascade. For simplicity, the disclosure generally speaks in terms of the process employed, rather than the systems employing the process. A person of skill in the art, however, would understand the requisite fluid communication elements required for the various membrane cascades disclosed herein. In certain aspects, the process comprises providing a hydrocarbon stream; selecting a first stage membrane effective to separate a hydrocarbon feed into a first stage permeate and a first stage retentate; wherein the heaviest molecule in the first stage permeate has a boiling point in the kerosene boiling range; selecting a second stage membrane effective to separate a hydrocarbon feed into a second stage permeate and a second stage retentate; wherein the heaviest molecule in the second stage permeate has a boiling point in the diesel boiling range; selecting a third stage membrane effective to separate a hydrocarbon feed a third stage permeate and a third stage retentate; wherein the heaviest molecule in the third stage permeate has a boiling point in the gas oil boiling range; selecting a fourth stage membrane effective to separate a hydrocarbon feed into a fourth stage permeate and a fourth stage retentate; wherein the heaviest molecule in the fourth stage permeate has a boiling point in the naphtha boiling range; and feeding the hydrocarbon stream to one of the first, second, third, or fourth stage membranes under effective separation conditions; feeding the applicable stage permeate and retentate to either a downstream refinery process or to another membrane stage; and repeating the preceding act until each of the first, second, third, and fourth stage membranes has performed a separation on the hydrocarbon stream, permeate from a previous membrane stage, or retentate from a previous membrane stage.

It should be clarified here that designators such as "first" or "second" are not meant as ordinal, but rather as simply a designator and more accurately describe the permeate product created by separation through that particular membrane as described above. In other words, the fourth membrane might be the first membrane to contact the hydrocarbon stream, while the first membrane might be the last membrane to contact a permeate or retentate product from a previous membrane stage, and so on.

In another aspect, the selecting a membrane for any of the stages comprises: obtaining compositional data of the hydrocarbon stream; said compositional data comprising one or more of API gravity, average molecular weight, aromaticity, average boiling point, density, total sulfur and nitrogen content, pour point, viscosity, metal content, total acid number (TAN), reid vapor pressure, Micro Carbon Residue content, C7 asphaltenes content, paraffin-naphthene-aromatic content, carbon to hydrogen ratio, and STAR-7 analysis; determining a desired diffusion of molecules through the membrane; selecting a membrane based on a relationship:

$$\text{Diffusion of molecules} \propto \frac{kT}{6\pi \text{ viscosity} * \text{Radius}} \text{function (Radius, } MW)$$

where k is the Boltzmann constant, T is temperature for separation, viscosity is the viscosity of the feed, radius is the radius of each molecule in the feed, and MW is the molecular weight of each molecule in the feed; wherein determining the relationship comprises; obtaining a hydrocarbon feed of known composition; obtaining a membrane; performing a separation experiment by contacting the hydrocarbon feed of known composition with the membrane thereby forming a control permeate and a control retentate; analyzing the control permeate and the control retentate via one of simulated distillation, elemental analysis, and STAR7 analysis; and establishing at least one parameter unique to the membrane as an input to the function(Radius, MW).

In yet another aspect, the relationship is based on the relationship:

$$\text{Diffusion of molecules} \propto \frac{kT}{6\pi \text{ viscosity}} \left(\frac{1}{\text{Radius}}\right)^a \left(\frac{1}{MW}\right)^b \text{ or}$$

Diffusion of molecules $\propto$ $$\frac{kT}{6\pi \text{ viscosity} * \text{Radius}} \left(1 - \frac{\text{Radius}}{\text{PoreRadius}}\right)^a \left(\frac{1}{MW}\right)^b$$

wherein PoreRadius is the pore size of the membrane, wherein a and b are the parameters unique to the membrane and are established via the relationship a, b $\propto$ function (MWCO). In sum cases, function(MWCO) is $$\frac{1}{\overline{MWCO}}.$$

In certain embodiments, the first stage membrane has a MWCO from about 100-500 Daltons and/or separates its stream via a reverse osmosis modality, a nanofiltration modality, or a combination thereof. In another aspect, the first stage membrane comprise perfluoropolymers.

In additional or alternative aspects, the second stage membrane has a MWCO from about 500-2000 Daltons and/or separates its stream via a nanofiltration modality, an ultrafiltration modality, or a combination thereof.

In additional or alternative aspects, the third stage membrane has a MWCO from about 2-500 kDaltons (e.g. 2-300 kDaltons, or 2-50 kDaltons), a pore size from 1.5-20 nm, or a combination thereof and/or separates its stream via an ultrafiltration modality.

In additional or alternative aspects, the fourth stage membrane has a MWCO of less than 200 Daltons, a pore size less than 1 nm, or a combination thereof and/or separates its stream via a reverse osmosis or pervaporation modality.

In yet another aspect, the hydrocarbon stream is pushed through the first stage membrane at a permeate yield from about 5 wt. % to about 75 wt. % of the whole crude feed, i.e. about 5 wt. %, or about 10 wt. %, or about 20 wt. %.

Additionally or alternatively, in certain embodiments the first stage retentate is pushed through the second stage membrane at a permeate yield of about 5 wt. % to about 25 wt. % of the first stage retentate.

Additionally or alternatively, in certain embodiments the second stage retentate is pushed through the third stage membrane at a permeate yield of about 5 wt. % to about 60 wt. % of the second stage retentate.

Additionally or alternatively, in certain embodiments the first stage permeate is pushed through the fourth stage membrane at a permeate yield of about 5 wt. % to about 25 wt. % of the kerosene or naphtha boiling range permeate.

In yet another aspect, the hydrocarbon stream is whole crude, topped crude, bitumen, FCC main fractionator feed, coker fractionator feed, hydrocracker fractionator feed, visbreaker fractionator feed, or a combination thereof.

In yet another aspect, at least one of the membrane stages comprises a membrane cascade comprising more than one membrane. In another aspect, the effective separation conditions comprise a temperature from 25° C.-300° C., feed pressure from 50-2000 psia, permeate pressure from 2-100 psia, and permeate yield from 5 wt. %-95 wt. %.

BRIEF DESCRIPTION OF THE DRAWINGS

FIG. 5A depicts a plot of feed, permeate and retentate differential by simulated distillation with the Arab Light membrane separation described in Example 1a.

FIG. 5B depicts a plot of feed, permeate and retentate wt. % OFF versus boiling point by simulated distillation with the Arab Light membrane separation described in Example 1a.

FIG. 14A shows solubility parameter as a function of boiling point for an Arab Light whole crude oil sample.

FIG. 14B shows solubility parameter as a function of molecular weight for an Arab Light whole crude oil sample.

FIG. 15 depicts a flow diagram illustrating the process of selecting a membrane to separate a hydrocarbon stream into boiling point fractions.

DETAILED DESCRIPTION

Definitions

Figure 1:
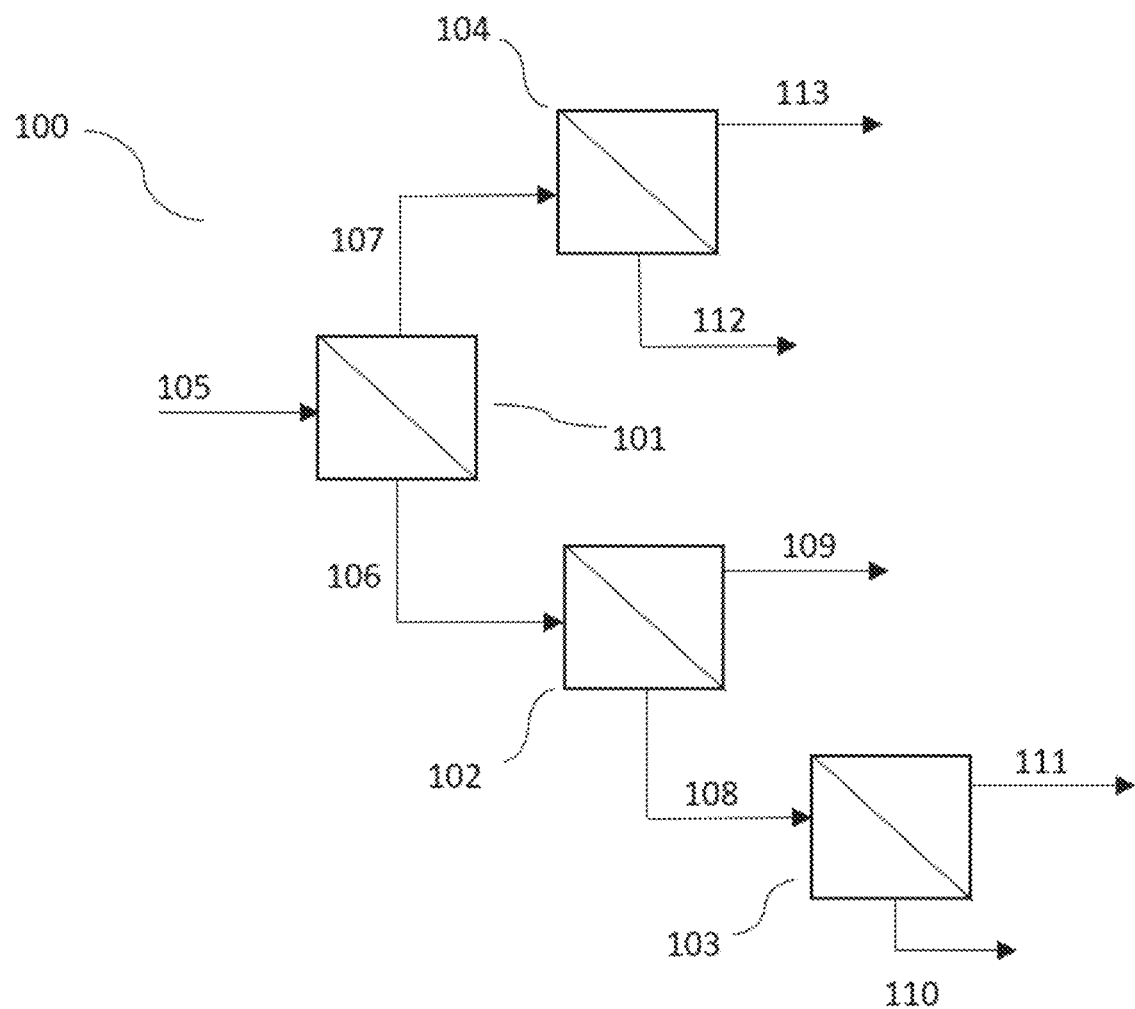
FIG. 1 shows an exemplary membrane cascade and resulting product fractions according to the present disclosure.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the apparatuses and processes encompassed are not limited to the specific embodiments described below, but rather, include all alternatives, modifications, and equivalents falling within the true spirit and scope of the appended claims.

Unless otherwise explained, all technical and scientific terms used herein have the same meaning as commonly understood by one of ordinary skill in the art to which this disclosure pertains. The singular terms "a," "an," and "the" include plural referents unless the context clearly indicates otherwise. Similarly, the word "or" is intended to include "and" unless the context clearly indicates otherwise. The term "includes" means "comprises." All patents and publications mentioned herein are incorporated by reference in their entirety, unless otherwise indicated. In case of conflict as to the meaning of a term or phrase, the present specification, including explanations of terms, control. Directional terms, such as "upper," "lower," "top," "bottom," "front," "back," "vertical," and "horizontal," are used herein to express and clarify the relationship between various elements. It should be understood that such terms do not denote absolute orientation (e.g., a "vertical" component can become horizontal by rotating the device). The materials, methods, and examples recited herein are illustrative only and not intended to be limiting The terms "raw crude" or "whole crude" as used herein, means unrefined crude oil.

The term "Conradson Carbon Residue" ("CCR") and "Micro Carbon Residue" (or "MCR") as used herein are considered equivalents and is a measure of carbon content of a sample as measured per test method ASTM D4530.

The term "average boiling point" as used herein is defined as the mass weighted average boiling point of the molecules in a mixture. This may be determined by simulated distillation gas chromatography (also referred to herein as "SIMDIS"). The term "final boiling point" is defined as the temperature at which 95 wt. % of the mixture is volatized at atmospheric (standard) pressure. All SIMDIS procedures described herein were carried out according to test method ASTM D7169. Boiling points, including fractional weight boiling points, can be determined using any appropriate ASTM test method, such as the procedures described in ASTM D2887, D2892, D6352, D7129, and/or D86.

The term "molecular weight cut-off" or "MWCO" is a characterization method to describe the pore size distribution and retention capabilities of membranes. It is defined as the lowest molecular weight (in Daltons) at which greater than 90% of a solute with a known molecular weight is retained by the membrane. Dextran, polyethylene glycol, polystyrene and dye molecules of various molecular weights are commonly used to obtain the MWCO of membranes. For example, a membrane that can retain solutes with molecular weights of 10,000+ Daltons has a molecular weight cutoff of 10,000. ASTM E1343-90 describes a standard test method for MWCO evaluation of flat sheet ultrafiltration membranes.

The term "% OFF" as used herein is a term describing the fraction of a given hydrocarbon sample that boils below a given temperature.

Overview

In various aspects, systems and methods are provided for boiling free fractionation of hydrocarbon streams utilizing a membrane cascade, such that the hydrocarbon streams are fractionated into their boiling point fractions. Below is a short description of boiling point ranges for different cuts. It should be appreciated by a person of skill in the art that there are not perfect cut points between the fractions. Thus, the below ranges contemplate a reasonable tolerance at the boundaries. Light hydrocarbons are usually referred to by their chemical name and/or carbon number, e.g. methane or $C_1$ fraction, while heavier streams are usually referred to by their "stream name" and/or boiling point range. As used herein, common refinery stream names are correlated to the following boiling point ranges: light naphtha is about $C_5$–180° F. (82° C.), heavy naphtha is about 180-380° F. (82-193° C.), kerosene/jet is about 380-460° F. (193-277° C.), diesel/No. 2 fuel is about 460-650° F. (277-343° C.), atmospheric resid is about 650-1500+° F. (343-816+° C.), light vacuum gas oil is about 650-925° F. (343-496° C.), heavy vacuum gas oil is about 925-1050° F. (496-566° C.), and vacuum resid is about 1050-1500+° F. (566-816+° C.). Included in these ranges is the recognition that the broader genus such as naphtha or vacuum gas oil includes the full breadth of heavy and light naphtha or vacuum gas oil.

Hydrocarbon resistant membranes typically have a specific molecular weight cut off (MWCO) based on their pore size. Utilizing a membrane or plurality of membranes, desired product cuts can be obtained within specific boiling point ranges. To further separate molecules within a boiling point range based on their class (e.g. degree of aromaticity) an additional membrane or stages of membranes can be utilized to simplify downstream conversion processes where providing the right molecules to the right process stream can make a significant impact. FIGS. 2A, 2B, and 2C and FIGS. 3A, 3B, and 3C represent the molecular weight and aromaticity relationship with boiling point for Arabian Light and Maya whole crudes, respectively. Aromaticity is a measure of how aromatic a particular molecule is. The molecules are assigned a value between 0 and 1 based on the percentage of aromatic carbons. For example, a molecule made of only aromatic carbon, e.g. benzene, would have an aromaticity of 1, a molecule with no aromatic carbon, e.g. hexane, would have an aromaticity of 0, and a molecule with some aromatic carbon, e.g. propyl benzene, would have an aromaticity of 0.67 (6 of 9 total carbons are aromatic). One skilled in the art will appreciate that as the crude feed becomes heavier, the aromaticity and molecular weight of the molecules increases with a corresponding increase in the boiling point.

A typical refinery stream contains millions of individual molecules with varying properties such as molecular weight, boiling point, chemical formula, density etc. For compositional simplicity (analytical and process modeling) these molecules are grouped into thousands of representative molecules (Structure Oriented Lumping. See generally, R. J. Quann and S. B. Jaffe, *Structure-Oriented Lumping: Describing the Chemistry of Complex Hydrocarbon Mixtures,* 31 IND. & ENG'G CHEM. RES. 2483 (1992)). This simplified representation of the complex refinery stream enables modeling of separation and conversion in refinery processes. The same representation could enable the molecular class makeup of the stream based on understanding of the separation. A molecular classification can be achieved in many different ways. Traditionally, the first level of classification is based on the presence of the heteroatoms such as S, N, O and metals such as Ni and V. All these molecules can be further classified by the degree of unsaturation or lack of hydrogen. A third dimension of molecular classification is based on number of rings in the molecules. All these classifications are inherently correlated with each other. A membrane process enables molecule size (molecular weight) and molecular class based separation. The molecular size based separation is given for a membrane process which is characterized based on molecular weight based cut-off (MWCO). Some membranes show inherent selectivity in class based separation. Such membranes when subjected to molecules of similar molecular weights show preferential permeance of one molecule class over other. In terms of the different axes of molecular classifications, the aromaticity often becomes a distinguishing factor.

Figure 4A:
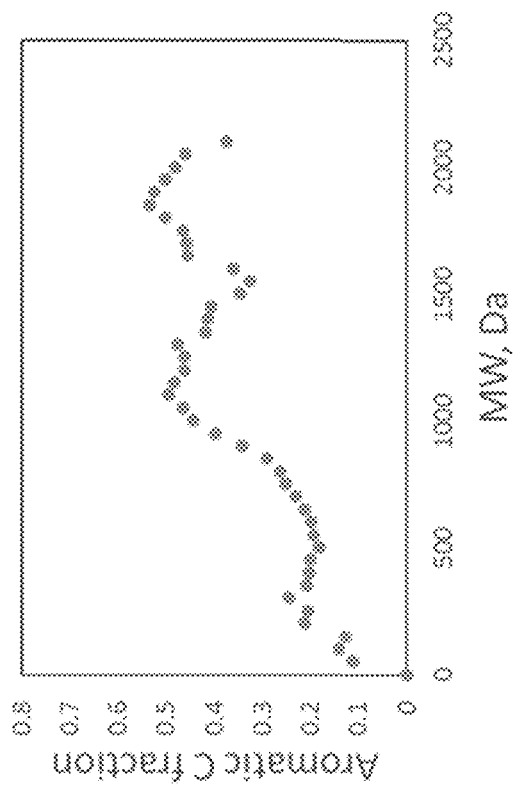
FIG. 4A graphically shows the aromatic carbon distribution as a function of boiling point for Arab Light whole crude.
Figure 4B:
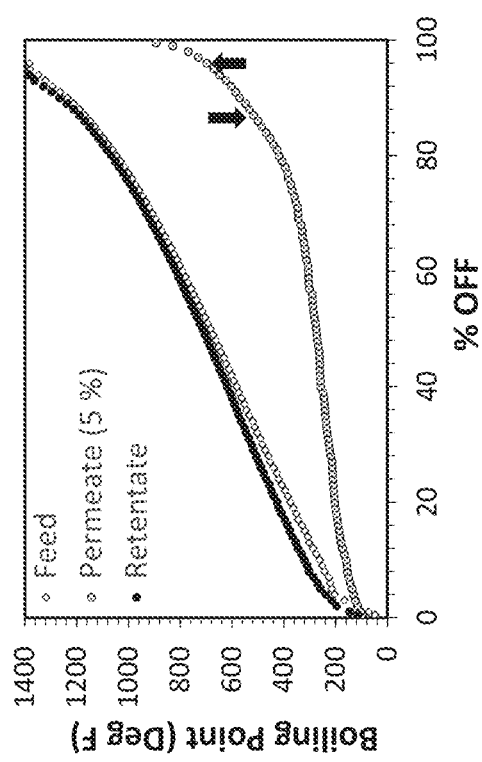
FIG. 4B graphically shows the aromatic carbon distribution as a function of molecular weight for Arab Light whole crude.

As shown in FIGS. 2B, 2C, 3B, and 3C, the molecular weight separation can achieve a different aromaticity content of a boiling point fraction than traditional distillation. This is further evidenced by FIGS. 4A and 4B. FIG. 4A shows a spike in aromaticity at the highest of boiling points, but generally, the molecular weight separation shows higher aromaticity for a given boiling point. This is significant because it shows that moderately aromatic, but mostly paraffinic, molecules, which are valuable in refining processes, can make their way into product streams via membrane separations, while those same molecules would likely end up in distillation bottoms via traditional distillation due to their high boiling point.

To obtain the various product cuts similar to atmospheric and vacuum distillation processes, multiple stages or a cascade type configuration of these membranes utilizing a range of membrane types, e.g. polymeric, zeolitic, ceramic, and metal, operating under various modalities, e.g. microfiltration (MF), ultrafiltration (UF), nanofiltration (NF), reverse osmosis (RO), forward osmosis (FO), and pervaporation and with different geometries, e.g. hollow fiber, monolith, spiral wound, are required to realize the separation of complex crude molecules.

Membrane Characteristics

Conventionally, filtration processes have been classified according to (i) the pressure required for the separation; (ii) the size of the rejected solute or, in turn, the size of the pore; (iii) the molecular weight cutoff (MWCO); and (iv) the transport mechanism governing the separation. Based on the pressure required for the separation, UF is a process in which the pressures from about 1 to 5 bar are applied, NF is a process in which pressures from about 5 to 20 bar are applied, and RO is a process with operating pressure higher than about 20 bar. According to the classification based on the size of the retained solute, UF is classified as a process in which molecules from about 2 to 100 nm are retained, NF is a process in which particles up to 2 nm are retained, and RO is a process in which only solvent permeates with pore sizes typically <1 nm.

Membranes are often characterized by their nominal MWCO, defined as the molecular weight of a reference compound, which is typically rejected by 90%. Because the MWCO value is obtained from rejection experiments, this characterization is strongly dependent on the properties of the solute and solvent, and the operating conditions chosen for the test.

According to the transport mechanism, membrane separation is based on both size exclusion and solubility of molecules through the membrane. As used herein, UF and MF are characterized by a sieving transport mechanism through pores of significant dimension, therefore described by the pore-flow mechanism. Pervaporation and RO are characterized by the solution-diffusion transport mechanism in which particles or molecules in the feed dissolve into the membrane material and then diffuse through the membrane down a concentration gradient. NF is intermediate between the two, and can potentially be characterized by both solution-diffusion and pore-flow transport mechanisms.

Typically, the membrane modality has conventionally been defined by the pore size or the MWCO of the membrane or the pressure required for the separation. However, we describe the membrane separation modality as dependent on the size of the molecules relative to the membrane pore size and relative to each other. Additionally, in typical membrane examples, the feed involves only a few components and depending on the pore size of the membrane and molecules, only one of the separation modalities i.e. either NF, RO, UF is found to be operating. Due to the high complexity of the feeds considered in this application, we have found that multiple separation modalities can occur within the same membrane due to the high difference between the size of the molecules, see e.g. FIG. 2A, which show molecular weight data for a whole crude sample varying from near 0 daltons to near greater than 2000 daltons. In other words, a membrane of a given size may be operating in UF for molecules in the feed that are an order of magnitude smaller than the membrane MWCO or pore size, but could simultaneously be operating in RO as to molecules in the feed that are roughly the same size and/or molecular weight was the pore size or MWCO of the membrane. This characterization however is strongly dependent on the properties of the feed, membrane pore size, and operating conditions.

To perform membrane separations on liquid hydrocarbons such as whole crude, the membranes utilized must be hydrocarbon resistant, meaning that they need to be able to maintain stability under severe operating conditions. Specifically, the membranes employed in the current process must be chemically stable in the liquid hydrocarbon environment. Whole crudes and crude fractions contain solvent range molecules such as benzene, toluene, xylenes, pentane, hexane, heptane, and other common hydrocarbon solvent mixtures like kerosene, Solvesso, A-200 etc. that could/will dissolve or embrittle non-hydrocarbon resistant membrane. Furthermore, whole crudes contain heavy molecules which oftentimes require elevated temperatures to ensure flowability of the feed. Thus, membranes used in the presently disclosed process should also have good thermal integrity. Ideally, membranes employed in this process should be stable at temperature from 75-760° F. (24-404° C.), e.g. between about 120-575° F. (49-302° C.) or 212-392° F. (100-200° C.). Finally, whether operating in UF, NF, RO, FO, or pervaporation modalities, the presently disclosed processes require elevated transmembrane pressures. Ideally, membranes used herein should be able to withstand transmembrane pressures greater than from about ambient to about 2000 psig (~13.8 MPag) depending on the membrane modality. For UF, NF and RO the feed is pressurized typically between 100 psig (~700 kPag) to 2000 psig (~13.8 MPag), with 2000 psig (~13.8 MPag) being a typical limit for a commercial membrane module. In UF, NF and RO the permeate side is typically between ambient pressure to say 100 psig (~700 kPag). In pervaporation the feed is anywhere between ambient to say 60 psig (~400 kPag) and the permeate side is at a vacuum with pressures being typically 0.2-0.3 bar (3-5 psia) but can be as low was 0.02 bar. In FO pressure differential does not drive the separation but rather, the driving force is forward osmotic pressure by use of a concentration gradient. In FO a large molecule naturally draws the faster permeating species through the membrane because of its higher osmotic pressure. FO requires another separation step in the permeate but the draw molecule is quite large in comparison to the permeate molecule and then can be easily separated using known techniques, such as distillation.

Membrane Modalities

As used herein, the "modality" of a membrane refers to the particular mode under which a membrane is effecting separation of a fraction of hydrocarbon molecules from a hydrocarbon stream. In membrane separations, the separation can generally take place via filtration or pore flow mechanism, e.g. ultrafiltration and/or microfiltration, or molecular separation, or solution diffusion mechanism e.g. reverse osmosis or pervaporation. In these cases, a pressure difference acting between two faces of a supported membrane provides the separation driving force.

As used herein, "ultrafiltration" or "UF" and/or "microfiltration" or "MF" refers to a membrane modality wherein a mechanical pressure gradient within the membrane motivates fluid movement through the pores of the membrane. Separation occurs because some molecules in the feed are rejected by the membrane simply due to size of the pores of the membrane as compared to the size of the molecules in the feed. Other molecules, however, are able to permeate the membrane because they are small enough to access the pore. Typically, the permeating and non-permeating molecules differ in size by one order of magnitude and the non-permeating molecules are usually at least about one order of magnitude bigger than the membrane pore size. Ultrafiltration or microfiltration membranes generally come in two general types. Surface or screen filters contain surface pores smaller than the particles to be removed from the feed fluid. Particles in the feed are captured and accumulate on the membrane surface. These surface filters are generally anisotropic with a thin microporous surface layer and more open macroporous support layers beyond the surface layer such that particles permeating the surface layer will not generally be captured on the interior of the membrane. Depth filters, on the other hand, capture target molecules or particles in the interior of the membrane. The average pore size is often ten times the diameter of the smallest particle able to permeate the membrane. Particles are rejected by adsorption to membrane surfaces as they penetrate the membrane by tortuous flow path. Depth filters are typically isotropic As used herein, "reverse osmosis" or "RO" refers to a membrane modality wherein a separation is performed on a liquid containing at least two components. Species in the feed are generally of the same order of magnitude in size to each other and to the membrane pore size. The separation follows a solution-diffusion model in which particles or molecules in the feed dissolve into the membrane material and then diffuse through the membrane down a concentration gradient. The particles are separated from one another because of the differences in solubilities of the particles in the membrane and the rates at which the particles diffuse through the membrane. Diffusion is an inherently slow process and practical fluxes are achieved by making membranes quite thin and creating large concentration gradients within the membrane.

In general, pressure driven membrane fluxes are higher than compared to fluxes obtained by solution-diffusion based reverse osmosis. The driving force across a reverse osmosis type modality is based on chemical potential difference or a fugacity gradient difference across the membrane, which is substantially lower than the driving force found in pressure gradient driven UF separations. For example—to drive separation of 50/50 mol. % p/o-Xylene mixture with a 2015 psia feed pressure to a 75/25 mol. % p/o-Xylene at 15 psia permeate pressure, the $\Delta$fugacity$_{p\text{-}xylene}$ is approximately 0.05 psi vs. $\Delta$Pressure=2000 psi across the membrane.

Thus, in liquid hydrocarbon separations, reverse osmosis separations generally require thin membranes and high applied pressure to be functional. Unlike UF, where flux across the membrane is directly proportional to hydraulic pressure across the membrane, flux in a RO modality is proportional to the fugacity difference of the component across the membrane or simply put the difference between the hydraulic pressure gradient across the membrane and the osmotic pressure gradient of the species across the membrane. Osmotic pressure is the minimum pressure required to stop osmotic flow across a RO membrane—i.e. it is the minimum pressure applied to a solution to prevent flow of pure solvent into the solution through a semipermeable membrane separating the two liquids. Reverse osmosis membranes generally come in three categories: molecular sieves, semi-rigid materials, and flexible polymers. Molecular sieves can generally be crystalline, such as with zeolites or metal organic frameworks (MOFs), or amorphous, such as with carbon molecular sieves and ceramic materials. Molecular sieves have rigid micropore and ultramicropore morphology. Flexible polymers have a distribution of penetrant-scale gaps that occur constantly within the material due to segmental motions. Semi-rigid materials have intermediate rigidity and can comprise polymers of intrinsic microporosity (PIMs) and thermally rearranged polymers. There also exists hybrid materials comprising characteristics of more than one of molecular sieves, semi-rigid materials, and flexible polymers.

As used herein, "pervaporation" refers to a separation modality that relies on vacuum on the permeate side of the membrane to evaporate the permeate from the surface of the membrane and maintain the concentration gradient driving force which drives the separation process. The permeate molecules present in the feed dissolve into the membrane film, migrate through said film and emerge on the permeate side under the influence of a concentration gradient. Pervaporation separation can be performed at a temperature of about of at least 80° C. and higher, preferably at least 100° C. and higher, more preferably 120° C. and higher can be used, more preferably 200° C. and higher can be used—100-220° C. being a typical range. Temperatures of about 210° C. have been successfully used with crosslinked polyarylate membranes, the maximum upper limit being that temperature at which the membrane is physically damaged. Vacuum on the order of 1-300 mm Hg is pulled on the permeate side. The vacuum stream containing the permeate is cooled to condense out the permeate. Condensation temperature should be below the dew point of the permeate at a given vacuum level.

As used herein, "nanofiltration" or "NF" refers to a membrane modality covering an area of separation between ultrafiltration and reverse osmosis. In NF, the slow permeating molecules (rejected molecules) can be on the same size order of magnitude as the pore of the membrane. In this case the slow permeating molecule moves through molecular sieving and experiences a fugacity gradient driving force which can simply be described as the difference between pressure gradient across the membrane and the osmotic pressure gradient across the membrane. The fast permeating molecules (permeate molecules) are much smaller than the pore and are driven through the membrane by hydraulic pressure. Accordingly, increasing transmembrane pressure can actually increase rejection in nanofiltration. In NF fast permeating and slow permeating molecules generally do not differ in size by more than an order of magnitude.

Membrane Materials

Membranes that may be used in the systems and process disclosed herein include organic (e.g. polymeric) membranes, inorganic (e.g. metallic, silica, ceramic, carbon, graphene, zeolite, MOF, oxide or glass) membranes, supported-liquid or facilitated transport membranes, hybrid or mixed-matrix membranes comprised of inorganic particles (e.g. a zeolite, carbon, metal, and/or metal oxide) as the dispersed phase and a polymer matrix as the continuous phase. As used here, "ceramic" includes materials selected from clays, titania, silica, alumina, cordierite, ferric oxide, boron nitride, zirconia, zeolitic materials, SiC, layered mineral structures, kaolinite, earthen ware materials, $SO_2/Fe_2O_3$, composites, layered structures comprising a combination of materials, foamed structures comprising a combination of materials, honey-combed configurations comprising a combination of materials, silicon nitride, sol-gel materials, steatite, porcelain, perovskites, macroporous and mesoporous materials, carbons, mixed matrix materials, and combinations thereof. Most preferably, the ceramics as used in the present invention are selected from materials comprised from clays, titania, silica, alumina, cordierite, ferric oxide, boron nitride, zirconia, zeolitic materials, glass, and SiC.

Polymer membrane materials which may be used include perfluoropolymers, cross-linked silicone, polyimides, cellulose acetate (CA), polysulfones regenerated cellulose, cellulose triacetate, polyether sulfones, polyetherimide, polyvinylidenefluoride, aromatic polyamides, aliphatic polyamides, polyamide-imides, polyetherimides, polyetheresters, polysulfones, polybenzimidazoles, polybenzoxazoles, polyacrylonitrile, polyaromaticpolyamide imides, polyamide esters, polyesters, etc., and combinations, copolymers, and substituted polymers thereof, nitrile rubber, neoprene, polydimethylsiloxane and related silicone polymers, chlorosulfonated polyethylene, polysilicone-carbonate copolymers, fluoroelastomers, plasticized polyvinylchloride, polyurethane, cis-polybutadiene, cis-polyisoprene, poly(butene-1), polystyrene-butadiene copolymers, polyamide-polyether block copolymers, styrene/butadiene/styrene block copolymers, styrene/ethylene/butylene block copolymers, and thermoplastic polyolefin elastomers.

Process Configuration and Operating Conditions

An exemplary membrane cascade system is provided in FIG. 1. Membrane cascade 100 is designed to receive a whole crude feed stream 105 and separate the stream into boiling point fractions via membrane stages 101, 102, 103, and 104. It should be noted that the membranes shown in FIG. 1 can be a single membrane or group of membranes and are shown as single membranes for simplicity. It should also be noted that feed stream 105 need not be a whole crude feed stream, but rather could comprise a partially refined feed stream. Perhaps most importantly, designators such as "first" or "second" are not meant as ordinal, but rather as simply a designator and more accurately describe the permeate product created by separation through that particular membrane as described above. In other words, the fourth membrane might be the first membrane to contact the hydrocarbon stream, while the first membrane might be the last membrane to contact a permeate or retentate product from a previous membrane stage.

The below description will be in reference to a whole crude separation to fully illustrate how the presently disclosed systems and processes are capable of providing boiling free fractionation of a whole crude feedstream into boiling point fractions without distillation.

One of the novelties of this process configuration is selecting and testing membranes for the intended separation performance defined in terms of boiling points cuts as described below. In order to select the membranes, one would require the understanding of the modality of the separation and relative transport behavior of molecules as a function of their structure. Ultimately, it is the relative transport behavior of the molecules also known as diffusion coefficient and solubility dictate the selectivity of the membrane separation. The simplest way to describe the diffusion of the molecule in the bulk liquid is by the Stokes-Einstein form where diffusion of the molecule is inversely proportional to the molecular size. In a membrane this inverse dependence could be further amplified and generally quantified in terms of MWCO. As membrane pore becomes narrower, the MWCO becomes smaller. However, the knowledge of the MWCO is not sufficient to access the membrane separation ability for any given feed including any crude types. Similarly the selection of the polymer type for solubility based separation of the crude molecules is non-intuitive and needs deeper knowledge of compositional solubility.

Figure 2A:
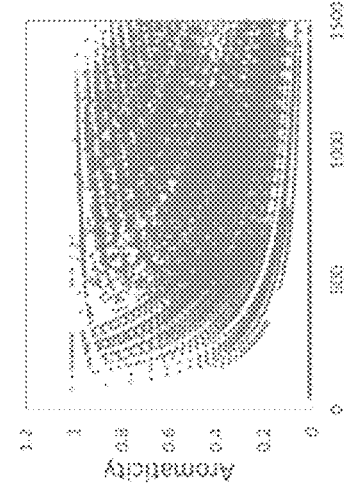
FIG. 2A graphically shows the molecular weight vs. boiling point relationship for Arab Light whole crude.
Figure 2B:
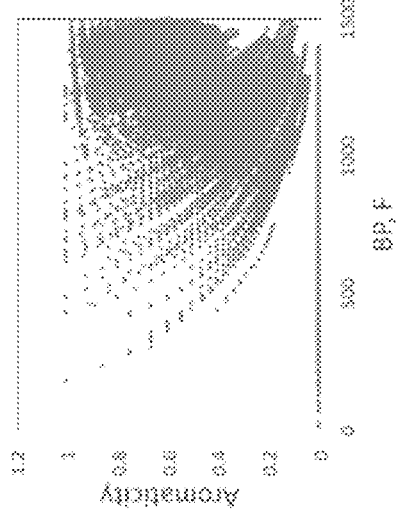
FIG. 2B graphically shows the aromaticity vs. boiling point relationship for Arab Light whole crude.
Figure 2C:
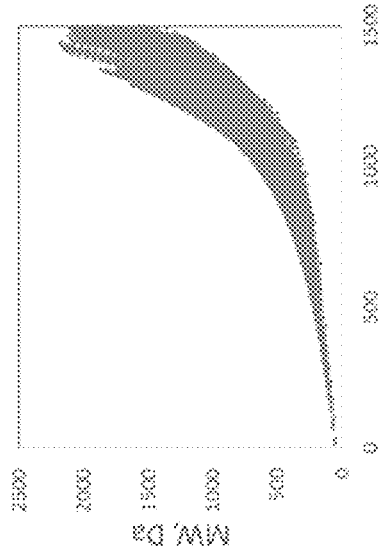
FIG. 2C graphically shows the aromaticity vs. molecular weight relationship for Arab Light whole crude.
Figure 3A:
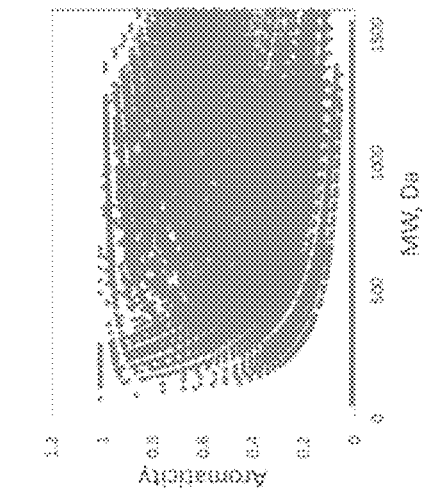
FIG. 3A graphically shows the molecular weight vs. boiling point relationship for Maya whole crude.
Figure 3B:
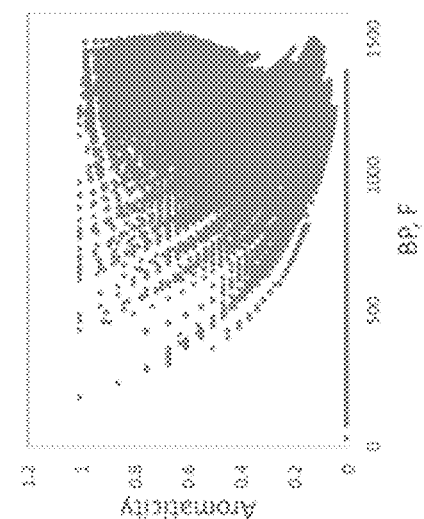
FIG. 3B graphically shows the aromaticity vs. boiling point relationship for Maya whole crude.
Figure 3C:
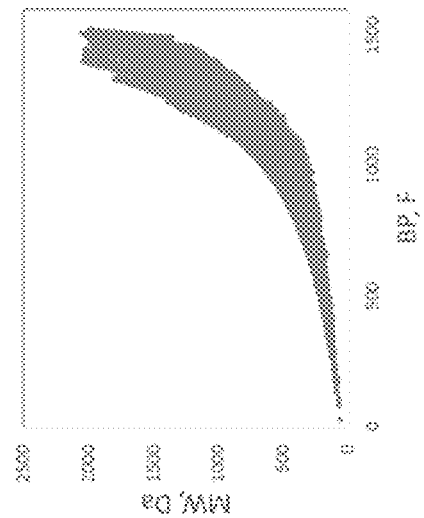
FIG. 3C graphically shows the aromaticity vs. molecular weight relationship for Maya whole crude.

When the refinery streams have narrow molecular weight distribution, particularly in stage 4 of the membrane cascade, naturally the only way to achieve boiling free separation is based on molecular shape and solubility behavior. Although, these separation modalities applies for all MW ranges, it is particularly more important for MW<500 Da (FIGS. 2A and 3A for 1000 F− crude fraction). For the fourth membrane stage where the diffusion between the paraffin and the 1-2 ring aromatics is of similar order of magnitude, the solubility selectivity of the membrane becomes important. This modality is particularly important for polymeric membranes. Depending on the relative solubility of the molecules in the membrane media, some of the molecules from the crude mixtures are either enriched or depleted in the membrane medium. In general, aromatic molecules have higher solubility in the traditional polymeric membranes while saturated molecules have lower solubility. Hence the aromatic molecules have preferential permeance relative to saturated molecules hence leading to class based separation. In Examples 6 and 7, we demonstrate such separation novelty for 460 F− stream for the fourth stage of the membrane cascade.

The relative solvency behavior of a specific molecule can be described using a numerical value known as "solubility parameter". It is derived from the cohesive energy density of the solvent, which in turn is derived from the heat of vaporization. The molecules with similar solubility parameters have higher solubility among each other. At the same time, molecules with very different solubility parameters are less soluble among each other and can form separate phase at higher concentrations. The solubility parameter of the molecule can be calculated from its structure using the Hansen solubility group additivity approach, see A. F. M. Barton, *CRC Handbook of Solubility Parameters and other cohesion parameters*" (2$^{nd}$ Ed.) 1991, the portions related to calculation solubility parameter being incorporated herein by reference. As mentioned previously (in FIG. 2A), for molecules below 1000 Da, the BP varies more rapidly with change in MW. Thus purely diffusion based separation (driven by MW) to mimic distillation is fundamentally disadvantaged. As shown in FIG. 14A, the solubility parameter of a molecule shows a more uniform variation with the boiling point, than it does with molecular weight (FIG. 14B). Thus, solubility based separation of the low MW (<1000 Da) part of the crude composition can be advantageously be achieved versus a MWCO or diffusion based separation.

Here the MW distribution is particularly narrow for corresponding BP distribution. The narrow MW distribution naturally implies smaller variation in average molecular size. In such situation with similar molecular size, a molecular shape based separation is needed as similarly size molecules can vary more widely in terms of the shapes leading to class based separation. To achieve molecular shape based separation, one requires a membrane with low MWCO.

In order to guide the selection of the membrane pore size or MWCO, we have formalized the molecular size and shape dependence of diffusion in a modified Stokes-Einstein form, which is reproduced below in Equations 1a, 1b, 1c, 2a, and 2b:

$$\text{Diffusion of molecules} \quad \frac{kT}{6\pi \, \text{viscosity} * \text{Radius}} \text{function (Radius, } MW\text{)} \quad \text{Eqn. 1a}$$

$$\text{Diffusion of molecules} \propto \frac{kT}{6\pi \, \text{viscosity}} \left(\frac{1}{\text{Radius}}\right)^a \left(\frac{1}{MW}\right)^b \quad \text{Eqn. 1b}$$

$$\text{Diffusion of molecules} \propto \quad \text{Eqn. 1c}$$
$$\frac{kT}{6\pi \, \text{viscosity} * \text{Radius}} \left(1 - \frac{\text{Radius}}{\text{PoreRadius}}\right)^a \left(\frac{1}{MW}\right)^b$$

$$a, b \propto \text{function } (MWCO) \quad \text{Eqn. 2a}$$

$$a, b \propto \frac{1}{MWCO} \quad \text{Eqn. 2b}$$

Where k is the Boltzmann constant, T is temperature for separation, viscosity is the viscosity of the feed, or retentate (at later membrane stages), radius is the radius of each molecule in the feed based upon its structure (see R. J. Quann and S. B. Jaffe, *Structure-Oriented Lumping: Describing the Chemistry of Complex Hydrocarbon Mixtures*, 31 IND. & ENG'G CHEM. RES. 2483 (1992)), and MW is the weight of each molecule, and PoreRadius is the membrane pore size per the particular membrane's specification. The equations above represent forms which can be used to predict diffusion of molecules through a particular membrane. In these equations, diffusion of molecules through a membrane is dependent on adjustable parameters "a" and "b." Adjustable parameters "a" and "b" are determined on a membrane by membrane basis using experimentally observed separations with specific membranes and a specific feeds with known characteristics.

FIG. 15 provides a flow diagram describing the process of determining parameter "a" and "b." As shown in FIG. 15, we begin by selecting multiple feeds of known characteristics, selecting a specific membrane, and setting process conditions. We then perform several separations with the same membrane using multiple feeds under multiple process conditions. We then analyze the permeates and retentates from such separations using analysis techniques such as simulated distillation, elemental abundance, and STAR-7 analysis described in U.S. Pat. No. 8,114,678 to Chawla, et al., which is incorporated herein by reference. We then refine parameters "a" and "b" for the specific membrane using the resulting data. That is, we match the model predicted properties with experimentally measured physical properties of the process streams. Parameters "a" and "b" are then correlated to the membrane specification such as MWCO as shown in Equations 2a and 2b. Once "a" and "b" are correlated to a membrane, any version of Equation 1 can be used to predict diffusion of molecules through a particular membrane for any crude separation. Knowing "a" and "b" and knowing desired diffusion enables prediction of what membrane will be suitable of a particular feed.

Figure 12:
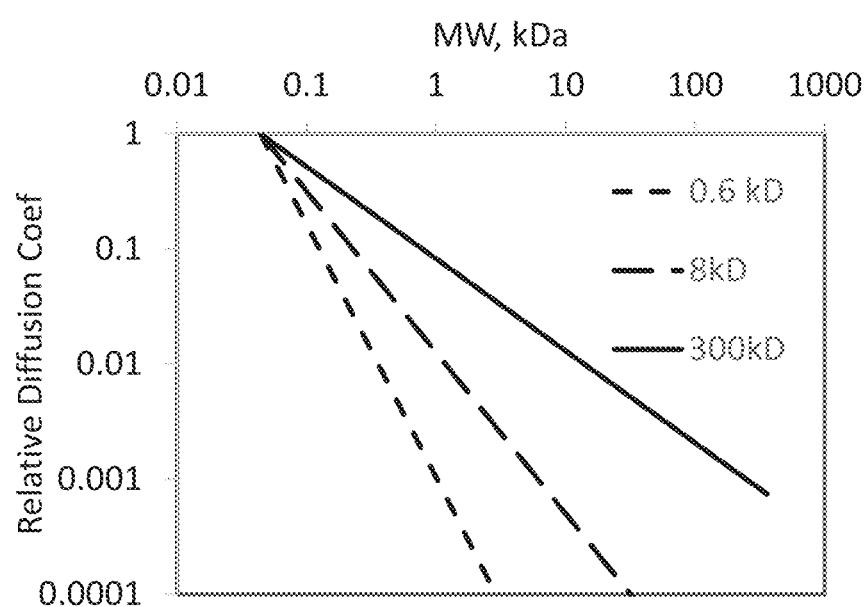
FIG. 12 shows relative diffusion as a function of the MW for three different membranes as described in Example 8.

Adjustable parameters "a" and "b" are inversely related to the MWCO. This model allows us to understand and predict the membrane separation performance in the context of the variable feed composition. In FIG. 12, we show the relative diffusion as a function of the MW for three different membranes later described in the examples below. Based on the model development procedure described above and in FIG. 15, we find that for many refinery streams, their permeation can be described using Eqn. 1b. As shown in the FIGS. 12 and 13A, the tighter pore membranes need steeper MW dependence in order to match experimental selectivities. This allows us to predict separation ability of any previously untested membrane in a robust way without extensive testing.

Description of a membrane cascade envisioned herein can best be understood in reference to the Figures. In FIG. 1, whole crude feed 105 is fed to first membrane stage 101. Whole crude feed 105 can be any number of whole crudes including, e.g. Arab Light, Bakken, Bonny Light, Brent, Maya, West Texas Intermediate, etc. The characteristics of the whole crude selected, e.g. API gravity, average molecular weight, aromaticity, average boiling point, density, total sulfur and nitrogen content, pour point, viscosity, metal content, total acid number (TAN), reid vapor pressure, Micro Carbon Residue content, C7 Asphaltenes content, paraffin-naphthene-aromatic content, C/H ratio will effect selection of first membrane stage 101.

In general, heavier feeds will require that first membrane stage 101 have a higher molecular weight cutoff than lighter feeds. This is because heavier feeds have less of the lower boiling point molecular weight molecules, less saturates and more multi-ring aromatics. In certain aspects, first membrane stage 101 can be an organic solvent membrane operating predominantly in the nanofiltration and reverse osmosis modalities (100-500 Daltons) although some of the molecules demonstrate ultrafiltration modality due to their smaller size compared to the MWCO of the membrane.

First membrane 101 separates whole crude feed 105 into a permeate stream 107 comprising a predominantly 460° F.− (~277° C.−) fraction, roughly corresponding the endpoint of the kerosene boiling point range, and a retentate stream 106 comprising a predominantly 460° F.+(~238° C.+) fraction. In certain aspects, greater than 60 wt. % of the permeate stream 107 comprises 460° F.− (~238° C.−) molecules, for example, greater than 70 wt. %, greater than 80 wt. %, greater than 85 wt. %, greater than 90 wt. %, or even greater than 95 wt. % of the permeate stream 107 comprises 460° F.− (~238° C.−). Additionally or alternatively 70 wt. %-95 wt. % of the of the permeate stream 107 comprises 460° F.− (~238° C.−) molecules, for example, 75%-95%, 80%-90%, 80%-95%, or even 90-95% of the of the permeate stream 107 comprises 460° F.− (~238° C.−) molecules.

Retentate stream 106 comprising a predominantly 460° F.+ (~238° C.+) fraction is then fed to a second membrane stage 102. In certain aspects, second membrane stage 102 may comprise a commercially available organic solvent nanofiltration membrane having a MWCO in the range of 1000-2000 Dalton. Second membrane stage 102 separates stream 106 into a permeate stream 109 comprising a substantially 650° F.− (~343° C.−) fraction, roughly corresponding to the endpoint of the atmospheric gas oil (AGO) boiling point range, and a retentate stream 108 comprising a substantially 650° F.+ (~343° C.+) fraction. In certain aspects, greater than 40 wt. % of the permeate stream 109 comprises 650° F.− (~343° C.−) molecules, for example, greater than 50%, greater than 60 wt. %, greater than 70 wt. %, greater than 80 wt. %, or even greater than 90 wt. % of the permeate stream 109 comprises 650° F.− (~343° C.−). Additionally or alternatively 40%-90% of the of the permeate stream 107 comprises 650° F.− (~343° C.−) molecules, for example, 50%-90%, 60%-90%, 50%-95%, or even 70-95% of the of the permeate stream 109 comprises 650° F.− (~343° C.−) molecules. Permeate stream 109 can then be sent to downstream refinery processes fit for AGO boiling fraction feeds, such as fuel oil, heating oil, distillate, hydrotreating or FCC feedstock, atmospheric gas oil or Diesel or No. 2 fuel in the range of 530-650° F. (277-343° C.).

Retentate stream 108 comprising a substantially 650° F.+ (~343° C.+) fraction is then fed to a third membrane stage 103. In certain aspects, third membrane stage 103 may comprise a commercially available ceramic membranes with a MWCO if the range of 2-20 nm or 2-500 kilodaltons (kD, 1 kD=1000 Daltons) at moderate temperatures (50-200° C.) and pressures (500-1500 psig). Third membrane stage 103 separates stream 108 into a permeate stream 111 comprising a fraction with a boiling point corresponding to the vacuum gas oil (VGO) boiling point range, i.e. about 650-1050° F. (about 343-566° C.), and a retentate stream 110 comprising a fraction in the resid boiling range, i.e. 1050° F.+ (566° C.+).

Permeate stream 107 comprising a predominantly 460° F.− (~238° C.−) fraction must be separated into kerosene and naphtha components via fourth membrane 104. In certain aspects, fourth membrane 104 may comprise a reverse osmosis or Pervaporation membranes operating in solution diffusion mode with a molecular weight cut-off <200 Daltons and or the pore size of <1 nm.

Conditions can be adapted to "push" various amounts of feed through the membrane. For example, the process can be run such that at least 5% of the feed by weight permeates the membrane, for example, at least 10%, or at least 15%, or at least 20%, or even at least 90% of the feed permeates the membrane. This can be adjusted by altering temperature and/or transmembrane pressure. In certain aspects, the process can take place at temperatures between 50° C. and 500° C. Additionally or alternatively, the process can take place at transmembrane pressures between 200 psig and 2000 psig. It should be understood by a person of skill in the art that the greater percentage of feed permeates the membrane, the less refined of fractions that the membrane will be able to produce.

The term "average boiling point" as used herein is defined as the mass weighted average boiling point of the molecules in a mixture. This may be determined by simulated distillation gas chromatography (also referred to herein as "SIMDIS"). The term "final boiling point" is defined as the temperature at which 95 wt % of the mixture is volatized at atmospheric (standard) pressure. All SIMDIS procedures were carried out according to test method ASTM D7169.

Iatroscan analysis was performed on the feed, the permeate, and the retentate fractions. The Iatroscan analysis procedure utilized is described further as follows. The Iatroscan performs quantitative analysis by detection of zones separated on a Chromorod thin layer using a GC type hydrogen Flame Ionization Detector (FID). The Chromorod is a quartz rod coated with a thin layer of sintered silica or alumina on which the sample is developed and separated at an advanced constant speed through a hydrogen flame by which the organic substance is separated on the thin layer and ionized through the energy obtained from the flame. Affected by an electric field applied to the poles of the FID, the ions generate an electric current with the intensity proportional to the amount of each organic substance entering the flame thereby enabling a quantitative determination. Typically, 1 ml of a sample is spotted at a marked position on the Chromorod. The rods are placed in solvent tanks for varying times for "development." The rods are dipped in the tanks to the level where the rod was spotted with the sample. Development, as used herein, refers to moving the species down the length of the rod, and is conducted done at room temperature. In the First Phase of Development, n-Heptane is utilized for 35 min. (moves the Saturates). In the Second Phase of Development, Toluene is utilized for 15 min. (moves the Aromatics). In the Third Phase of Development, Methylene Chloride/Methanol at 0.95/0.5 ratio is utilized for 2 min. (moves the Resins). The fourth group, i.e., the Polars, remains near the spotting location. The sample rods are then fed at a controlled rate through a hydrogen flame to create the gases analyzed by FID. Generally four well separated peaks are quantified.

Example 1a—Boiling Free Fractionation of Arab Light Whole Crude (Stage 1 of Membrane Cascade)

Figure 5A:
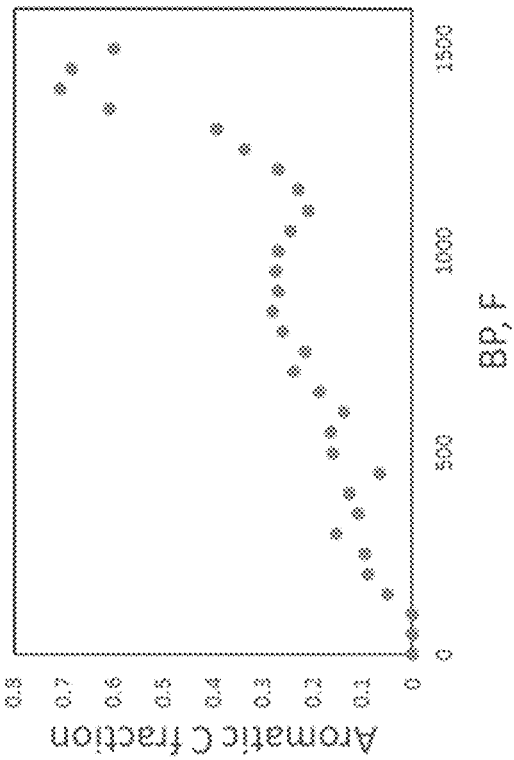
Figure 5B:
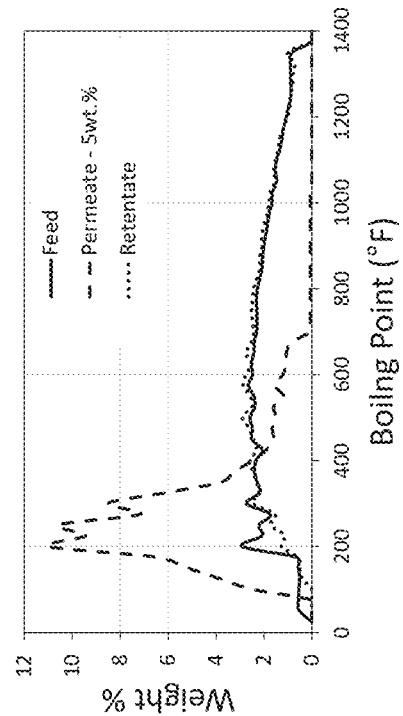

FIG. 1 schematically illustrates the boiling free fractionation into boiling point fractions of a sample whole crude. In this example, desalted Arab Light whole crude feed was utilized as the hydrocarbon feed stream to the membrane process. The feed was permeated in a batch membrane process using a 47 mm diameter asymmetric amorphous perfluoropolymer membrane coupon with a molecular weight cut off between 300-400 Daltons. In the batch experimental process, 100-250 mL of hydrocarbon feed was added to a batch cell, the membrane was mounted at the bottom of the cell and ensured that it was sufficiently free of leaks or defects. The transmembrane pressure was held at 500 psig (~3.4 Mpag) and the feed temperature was held at about 212° F. (100° C.) assisted with constant stirring at 400 rpm with a mechanical stirrer. Permeate samples then travelled through a heated permeate sample line and were collected in vials. Select permeate samples and a retentate sample were extracted during the test along with flux rates and permeate yields measurement. In this experiment one permeate sample was collected at 5 wt. % yield. Simulated distillation results for the permeate, feed, and the retentate are shown in FIG. 5A. It can be observed that the membrane is capable of separating the permeate fraction into predominantly 460° F.– fraction—84 wt. % OFF (end point of kerosene/jet range) making this type of membrane suitable as the first membrane in the cascade. The flux through the membrane was approximately 1 g/hr. FIG. 5B depicts the same data in a different way and shows that the vast majority of the permeate product has a boiling point less than about 460° F. (~238° C.). This is shown in the elemental analysis depicted in Table 1 where microcarbon residue, metals, N, S species are significantly reduced in the permeate samples.

TABLE 1

|  | MCR (wt. %) | C (wt. %) | H (wt. %) | C/H | N (ppm) | S (wt. %) | Ni (ppm) | V (ppm) |
| --- | --- | --- | --- | --- | --- | --- | --- | --- |
| Feed (g) | 4.4 | 85.2 | 14.7 | 5.79 | 1300 | 1.87 | 6.00 | 15.0 |
| Permeate-5% | 0.0 | 86.0 | 15.0 | 5.73 | 736 | 0.16 | <1.48 | <1.48 |
| Retentate | 4.6 | 85.9 | 12.2 | 7.04 | 1430 | 2.20 | 6.40 | 16.0 |

Example 1b—Boiling Point Fractionation of Arab Light Whole Crude (Same Membrane as 1 but with Deeper Stage Cut and Additional Characterization Data)

Figure 5C:
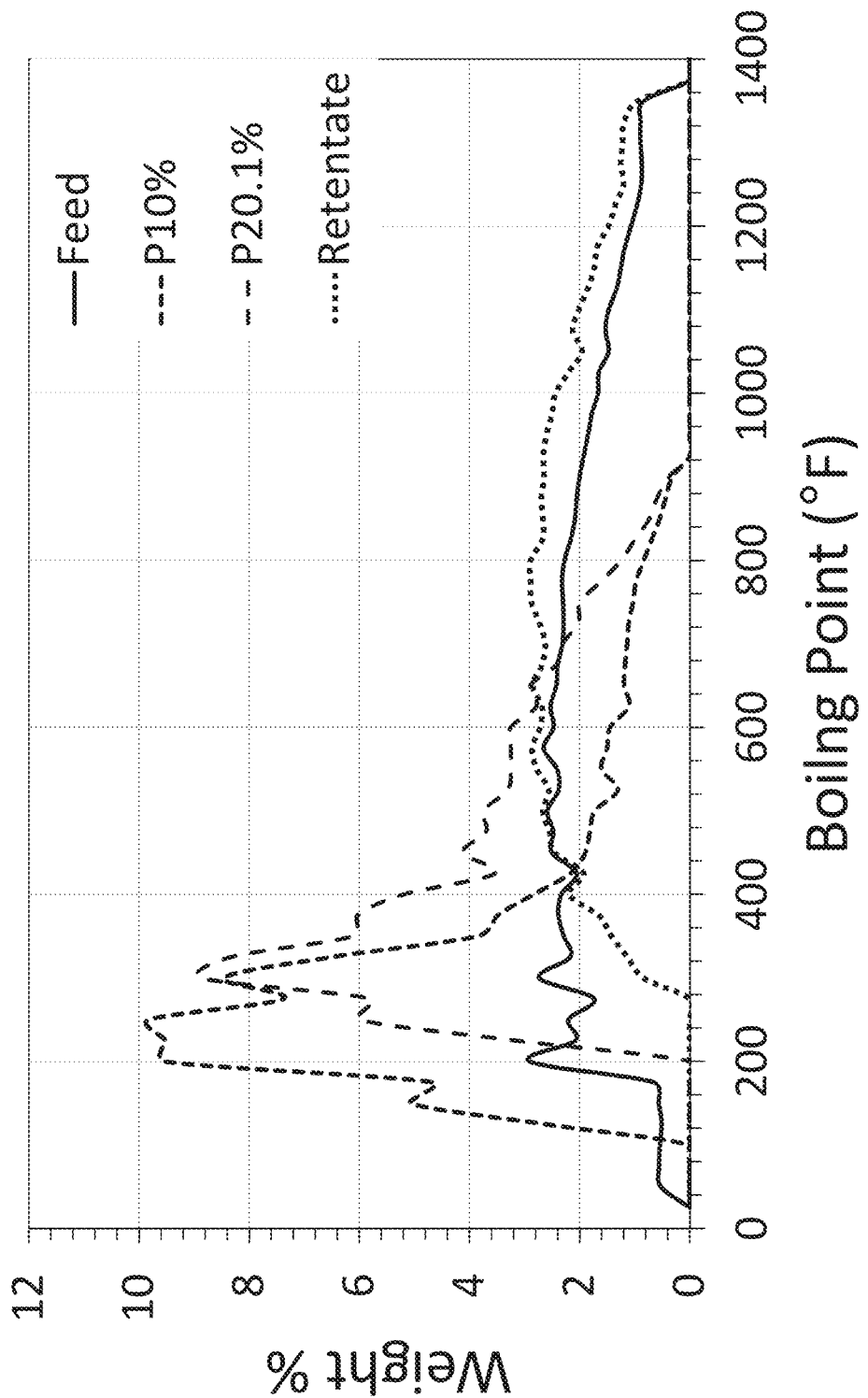
FIG. 5C depicts a plot of feed, permeate and retentate differential by simulated distillation with the Arab Light membrane separation described in Example 1b.

The same membrane and feed were tested under the same conditions as Example 1a except that transmembrane pressure was held at 600 psig (~3.45 MPag). In this experiment two permeate samples were collected at 10 wt. % and 20 wt. % yields, respectively. Simulated distillation results for the permeate, feed, and the retentate are shown in FIG. 5C. It can be observed that the membrane is capable of producing a permeate of predominantly 460° F.– fraction—80 wt. % OFF (end point of kerosene/jet range) for 10 wt. % yield and 460° F.– fraction—57 wt. % OFF (end point of kerosene/jet range) for 20 wt. % yield making this type of membrane suitable as the first membrane in the cascade. Membrane flux was in the 0.3-1 g/hr range. The saturates content of the permeate went up with a concomitant reduction in aromatics, polars and resins species in the permeate stream is observed as shown in Table 3. Correspondingly, the saturate content in the retantate went down and the aromatics, polars, sulfides content went up in the retentate. Elemental analysis data provided in Table 2 shows that microcarbon residue, metals, N, S species are significantly reduced in the permeate samples. The yield-purity trade-off can be observed for all the tested membranes with the lower yields (i.e. 5 wt. %) providing the highest enrichment of lower boiling point (and likely smaller/lighter species. As higher yields are pushed through the membranes (i.e. 10 wt. % and 20 wt. %), the purity of permeate goes down as shown in FIG. 5C with the 20 wt. % permeate curve shifting to the right of the 10 wt. % permeate curve.

TABLE 2

|  | MCR | C | H | N | S | Ni | V |
| --- | --- | --- | --- | --- | --- | --- | --- |
| Feed (g) | 4.4 | 85.2 | 14.7 | 1300 | 1.88 | 5.80 | 15.1 |
| Per-10% | ~0 | 84.1 | 13.0 | 568 | 1.41 | 0.20 | 0.2 |
| Per-20% | ~0 | 84.2 | 13.8 | 162 | 1.47 | 0.20 | 0.2 |
| Retentate | 6.1 | 84.5 | 12.5 | 1160 | 2.57 | 6.00 | 17.0 |

TABLE 3

|  | Sat | arom | resins | Polar |
|---|---|---|---|---|
| Feed | 28.62 | 56.05 | 8.26 | 7.06 |
| P1 10% | 82.0 | 16.9 | 1.1 | 0.0 |
| P2 20% | 69.8 | 28.5 | 1.6 | 0.2 |
| Retentate | 26.08 | 56.9 | 9.8 | 7.3 |

Example 2—Boiling Free Fractionation of Arab Light Whole Crude (Stage 1 of the Membrane Cascade)

A commercially available asymmetric P84 polyimide membrane Puramem® Evonik-280 with a MWCO of approximately 280 Daltons was tested with Arab Light crude at 212-284° F. (100-140° C.) and 600-800 psig (~4.1-5.5 MPag) transmembrane pressure. If considering a 460° F.-(238° C.-) fraction as the first stage of the membrane cascade, this membrane exhibits 60 wt. % OFF for the permeate at 5 wt. % yield, 48 wt. % OFF for the permeate at 10 wt. % yield, and 42 wt. % OFF for the permeate at 25 wt. % yield. Expectedly, a higher yield, though desirable, can lead to lower purity with membrane separations. The lower purity with higher yield can be rectified by further cascading the membrane within the given stage.

Figure 6A:
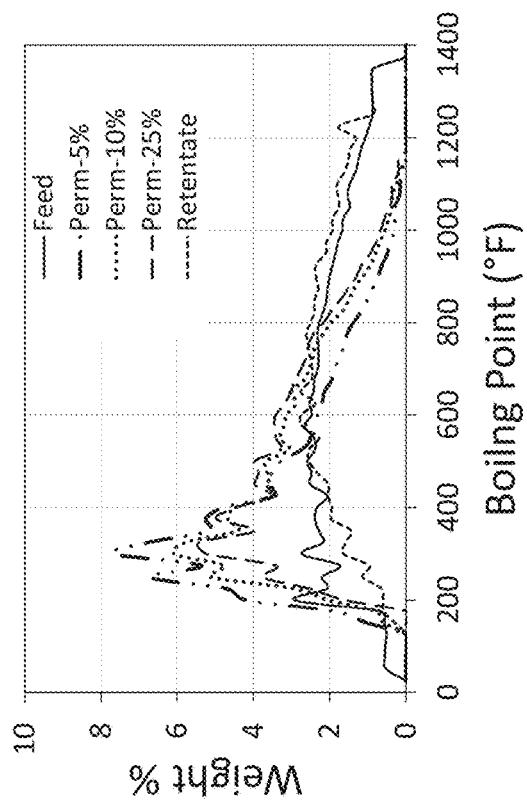
FIG. 6A depicts a plot of feed, permeate and retentate wt. % OFF versus boiling point by simulated distillation with the Arab Light membrane separation described in Example 2.
Figure 6B:
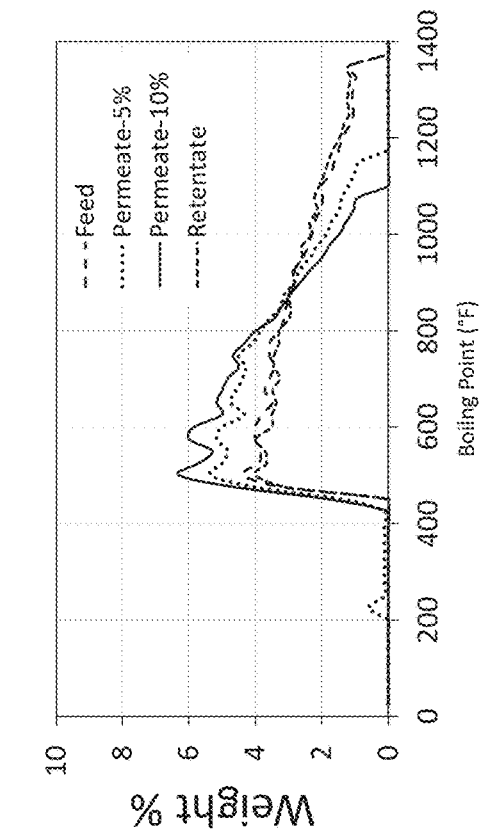
FIG. 6B depicts a plot of feed, permeate and retentate differential by simulated distillation with the Arab Light membrane separation described in Example 2.

Simulated distillation results for the permeate and the feed are shown in FIGS. 6A and 6B. Table 4 additionally shows an enrichment in saturates with a concomitant reduction in aromatics, polars and resins species in the permeate stream. This can also be observed in the elemental, metals and MCR speciation of the streams where MCR, metals, N, and S species are significantly reduced in the permeate samples, as shown in Table 5. The membrane demonstrated a flux of 0.2 g/h. An enrichment in the saturates content along with the reduction in aromatics, resins, and polars content in the permeate vs. the feed clearly indicates that the membranes separate based on the class/size of the molecules, which is not necessarily true in boiling point separations such as traditional distillations. However, often polars, resins, asphaltenes, and metals have both larger size and boiling point.

Compared to the membrane in Examples 1a and 1b, which is of similar MWCO, this membrane unexpectedly however shows a relatively poor permeate quality if deployed as the first stage in the membrane cascade. The SIMDIST data along with the elemental, metals, MCR, Iatroscan data shows that the membrane in Examples 1a and 1b has an improved performance compared to the membrane in this Example 2 despite having similar MWCO. Without being bound by theory, it is believed that the unexpected results can be explained by the solubility or class based separation characteristic difference between the perfluoropolymer membrane of Examples 1a and 1b and the hydrocarbon based polyimide membrane of this Example. Due to the similar MWCO of the two membranes, the rate of diffusion is expected to be of similar order of magnitude. It is believed that the perfluoropolymers due to their highly inert, hydrophpobic nature have a 2-3 order of magnitude lower solubility to the aromatic or polar molecules as compared to the polyimide membrane. Generally speaking, diffusion and solubility often tend to act in an opposite direction with aromatic molecules showing a higher solubility through the polymers compared to paraffinic molecules, and the paraffinic molecules have a smaller molecular diameter compared to aromatic molecules and hence have a higher diffusion coefficient. The fluorinated chains of the polymer tend to be highly hydrophobic and reject molecules based on their degree of aromaticity with the more aromatic species being rejected to a higher extent. The 10 wt. % yield can be compared between the two membranes. The Iatroscan data shows a higher degree of saturates content in the perfluoropolymer membranes vs. the polyimide membrane.

TABLE 4

|  | Saturates | Aromatics | Resins | Polars |
|---|---|---|---|---|
| Feed | 30.6 | 54.2 | 9.6 | 5.5 |
| 5% | 49.6 | 41.4 | 7.2 | 1.8 |
| 10% | 47.2 | 46.4 | 3.9 | 0.0 |
| 25% | 41.8 | 54.2 | 3.8 | 0.2 |
| Retentate | 21.6 | 64.9 | 7.7 | 5.8 |

TABLE 5

|  | MCR | C | H | N | S | Ni | V |
|---|---|---|---|---|---|---|---|
| Feed (g) | 4.4 | 85.9 | 11.8 | 1200 | 1.65 | 6 | 15 |
| Per-5% | 0.2 | 85.6 | 15.3 | 691 | 0.78 | <0.55 | <0.55 |
| Per-10% | 0.3 | 85.5 | 13.9 | 621 | 1.16 | 0.62 | 0.73 |
| Per-25% | 0.4 | 85.4 | 14.1 | 671 | 1.48 | <0.597 | 0.8 |
| Retentate | 6.9 | 84.9 | 12.4 | 1499 | 2.63 | 9 | 20 |

Example 3—Boiling Free Fractionation of Arab Light Whole Crude (Stage 2 of the Membrane Cascade)

Figure 7A:
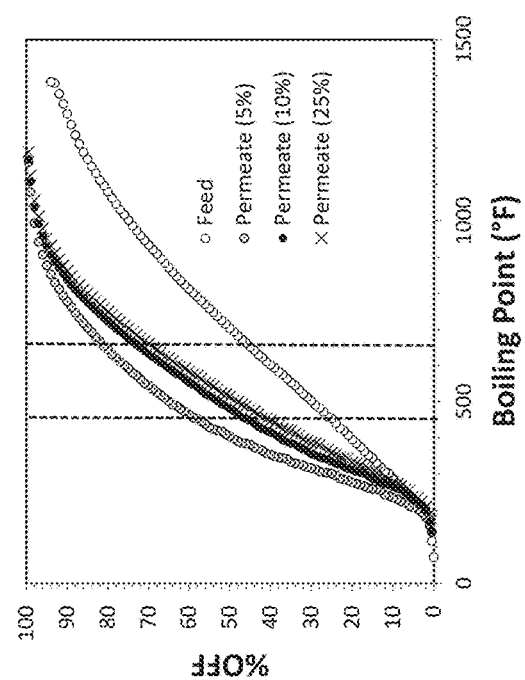
FIG. 7A depicts a plot of feed, permeate and retentate wt. % OFF versus boiling point by simulated distillation with the Arab Light membrane separation described in Example 3.
Figure 7B:
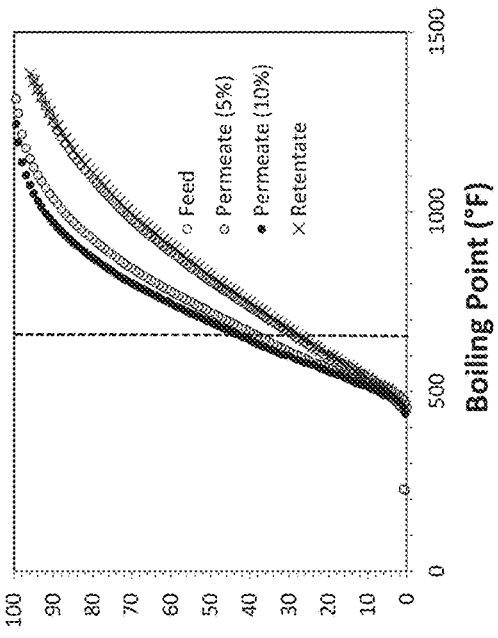
FIG. 7B depicts a plot of feed, permeate and retentate differential by simulated distillation with the Arab Light membrane separation described in Example 3.

An Arab Light crude fraction 460° F.+ (238° C.+) was exposed to a cross-linked siloxane co-polymer membrane with a thickness of <100 nm on a cross-linked Ultem™ polyetherimide support at 70° C. and 600 psig transmembrane pressure. The membrane MWCO as measured with toluene and polystyrene solution was about 1400 Daltons. This membrane could be suitable as the second stage in the cascade to collect a 650° F.+ (343° F.+) fraction showing 81 wt. % OFF for the permeate at 5 wt. % yield and 72 wt. % OFF for the permeate at 10 wt. % yield as depicted in FIGS. 7A and 7B. Table 8 shows the class and size based separation performance more clearly, with the membrane permeates significantly enriched in saturates with a concomitant reduction in aromatics, sulfides, polars. Data for Table 8 was obtained using the STAR-7 technique described in U.S. Pat. No. 8,114,678 to Chawla, et al., which is incorporated herein by reference. Table 6 additionally shows an enrichment in saturates with a concomitant reduction in aromatics, polars and resins species in the permeate stream. This can also be observed in the elemental, metals and MCR speciation of the streams where MCR, metals, N, and S species are significantly reduced in the permeate samples, as shown in Table 7.

TABLE 6

|  | Saturates | Aromatics | Resins | Polars |
|---|---|---|---|---|
| Feed | 37.13 | 54.55 | 4.42 | 3.89 |
| 5% | 47.11 | 48.39 | 4.40 | 0.08 |
| 10% | 46.79 | 50.15 | 2.77 | 0.28 |
| Retentate | 37.93 | 46.05 | 8.00 | 5.02 |

TABLE 7

|  | MCR | C | H | N | S | Ni | V |
|---|---|---|---|---|---|---|---|
| Feed (g) | 5.4 | 85.1 | 11.5 | 1365 | 2.0 | 5.3 | 16.0 |
| Per-5% | 1.4 | 86.3 | 12.8 | 316 | 1.9 | <1.2 | 1.3 |
| Per-10% | 0.4 | 85.8 | 13.3 | 195 | 1.7 | <1.3 | <1.3 |
| Retentate | 6.4 | 82.3 | 11.8 | 1305 | 2.4 | 6.2 | 18 |

TABLE 8

| Description (wt. %) | Feed | P5% | P10% | Ret |
|---|---|---|---|---|
| SATURATE | 45.4 | 54.6 | 58.8 | 43.1 |
| ARC1 | 14.2 | 13.4 | 13.1 | 13.1 |
| ARC2 | 12 | 11.3 | 10.3 | 12 |
| ARC3 | 12.1 | 11.5 | 10.2 | 13.5 |
| ARC4 | 7.6 | 5.7 | 4.9 | 10.1 |
| SULFIDES | 5.6 | 3.2 | 2.7 | 6.6 |
| POLARS | 3.2 | 0.3 | 0.0 | 1.7 |

*ARC—Aromatic Ring Class

Example 4—Stage 3 of the Membrane Cascade

Figure 8B:
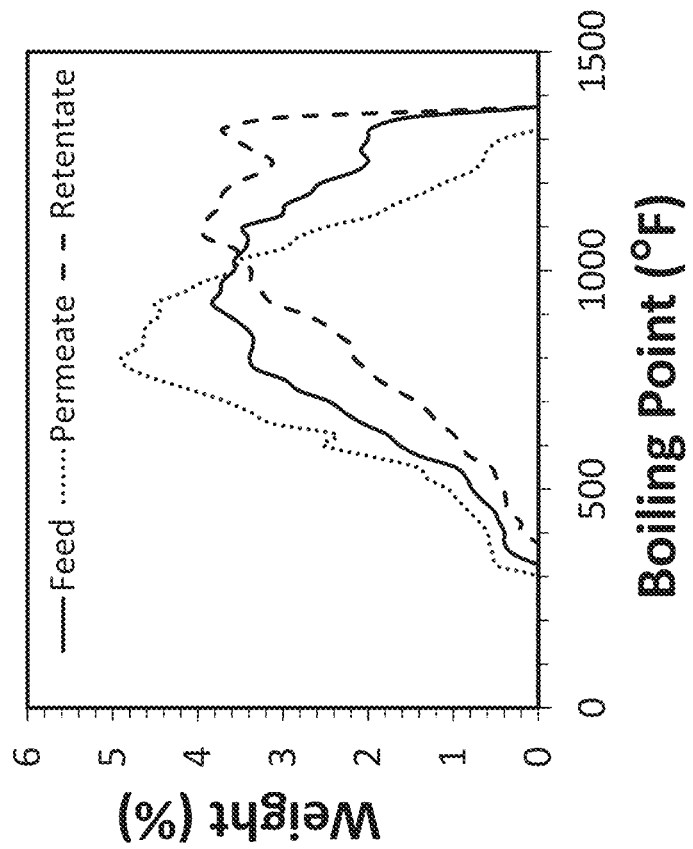
FIG. 8B depicts a plot of feed, permeate and retentate differential by simulated distillation with the Arab Light 650° F.+ membrane separation described in Example 4.
Figure 8A:
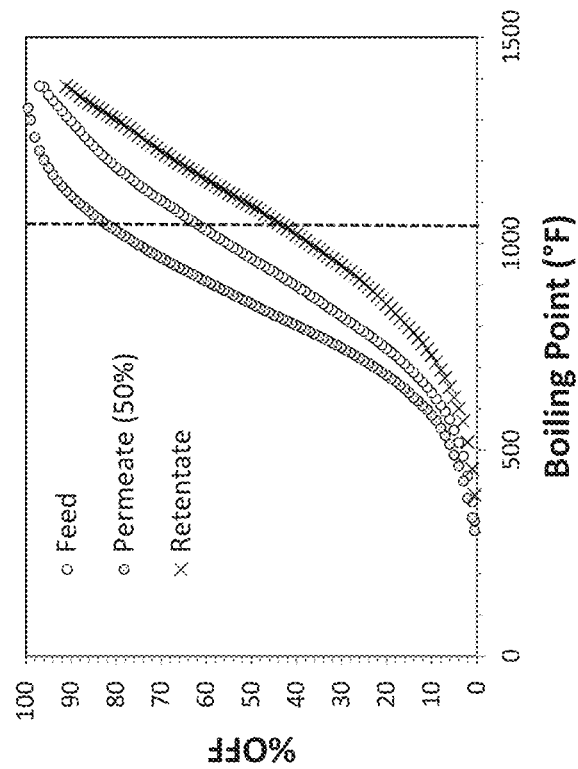
FIG. 8A depicts a plot of feed, permeate and retentate wt. % OFF versus boiling point by simulated distillation with the 650° F.+ membrane separation described in Example 4.

To demonstrate applicability across various feed types a refinery atmospheric resid feed—i.e. comparable to the 650° F.+ (343° F.+) retentate from stage two of the cascade—was separated with an ultrafiltration ceramic membrane with a MWCO ~8 kDalton separation layer operated at 266-302° F. (~130-150° C.), 800-900 psig (~5.5-6.2 MPag) transmembrane pressure, and 50 wt. % yield. As depicted in FIGS. 8A and 8B, 90 wt. % OFF the permeate fraction was found to be <1050° F. (~566° C.) boiling point clearly showing vacuum resid or asphalt type molecules were rejected. The retentate stream showed ~60 wt. % OFF molecules boiling above 1050° F. boiling point. Additionally the permeate stream showed increased elemental, metals and MCR rejection (Table 10) with enrichment in saturates and a decrease in wt. % aromatics, resins and asphaltenes (Table 9) enabling the membrane permeate stream to be of VGO quality.

TABLE 9

|  | % Sats | % Aromatics | % Resins | % Asphaltenes |
|---|---|---|---|---|
| Feed | 23.02 | 57.15 | 9.81 | 10.01 |
| Permeate | 39.11 | 55.38 | 4.56 | 0.94 |
| Retentate | 11.10 | 62.22 | 13.33 | 13.33 |

TABLE 10

|  | MCR | C | H | N | S | Ni | V |
|---|---|---|---|---|---|---|---|
| Feed (g) | 9.2 | 85.4 | 10.0 | <0.5 | 3.30 | 26 | 81 |
| Permeate | 2.7 | 85.6 | 9.3 | <0.6 | 2.44 | <11 | <10 |
| Retentate | 17.2 | 84.9 | 9.9 | <0.7 | 3.16 | 31 | 97 |

Figure 9A:
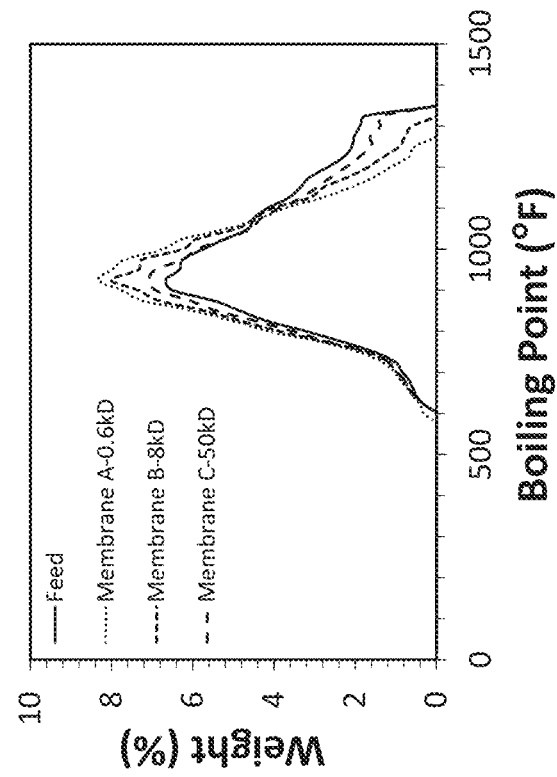
FIG. 9A depicts a SIMDIST plot of 650° F.+ feed vs. permeate at 0-25% yield showing a relative quality of the permeate using different membranes as described in Example 5.
Figure 9B:
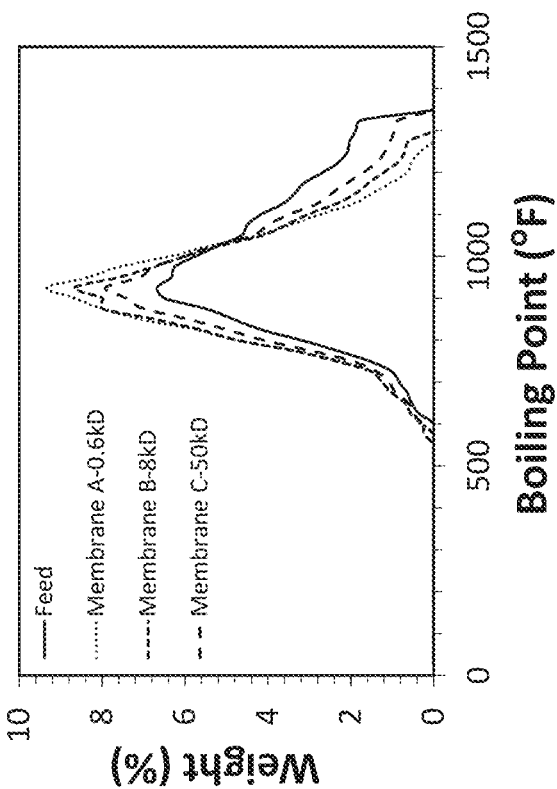
FIG. 9B depicts a SIMDIST plot of 650° F.+ feed vs. permeate at 25-50% yield showing a relative quality of the permeate using different membranes as described in Example 5.

Example 5—Comparison of Membranes for a Refinery Stream with Majority 650° F.+ Components A refinery stream from an atmospheric distillation column bottoms with majority 650° F.+ (~343° F.+) components was used as a feed to three membranes with different molecular weight cut offs to demonstrate the effect of membrane pore size on separation performance. All the membranes were tested at 266° F. (130° C.), 700 psig with a batch unit impeller speed of 400 rpm. Membrane A was crosslinked siloxane membrane with a MWCO of 0.6 kD on a porous P84® polyimide support, Membrane B and membrane C are 8 kD cut off (or 2 nm nominal pore size) and 50 kD cut off (4 nm nominal pore size), respectively, ceramic membranes. The ceramic membranes have 2.5 mm thickness and are made up of a $TiO_2$ support layer and a $TiO_2$ active layer (for 8 kD) and $ZrO2$ active layer (for 50 kD). The support layer comprises about 80-90 wt. % of the membrane and the active layer is about 10-20 wt. %. FIG. 9A provides a SIMDIST plot of feed vs. permeate at 0-25% yield showing the change in the quality of permeate from a tighter membrane (0.6 kD) to a more open membrane 50 kD. As shown, smaller pore size results in an improved (lighter or lower boiling point) product. FIG. 9B shows that the permeate quality trend holds at 25-50% yield with different membranes however, the purity of the permeate streams however is lower than the 25% yield graph in FIG. 9A. These charts clearly represent the effect of pore size and yield-purity trade-off.

Figure 10A:
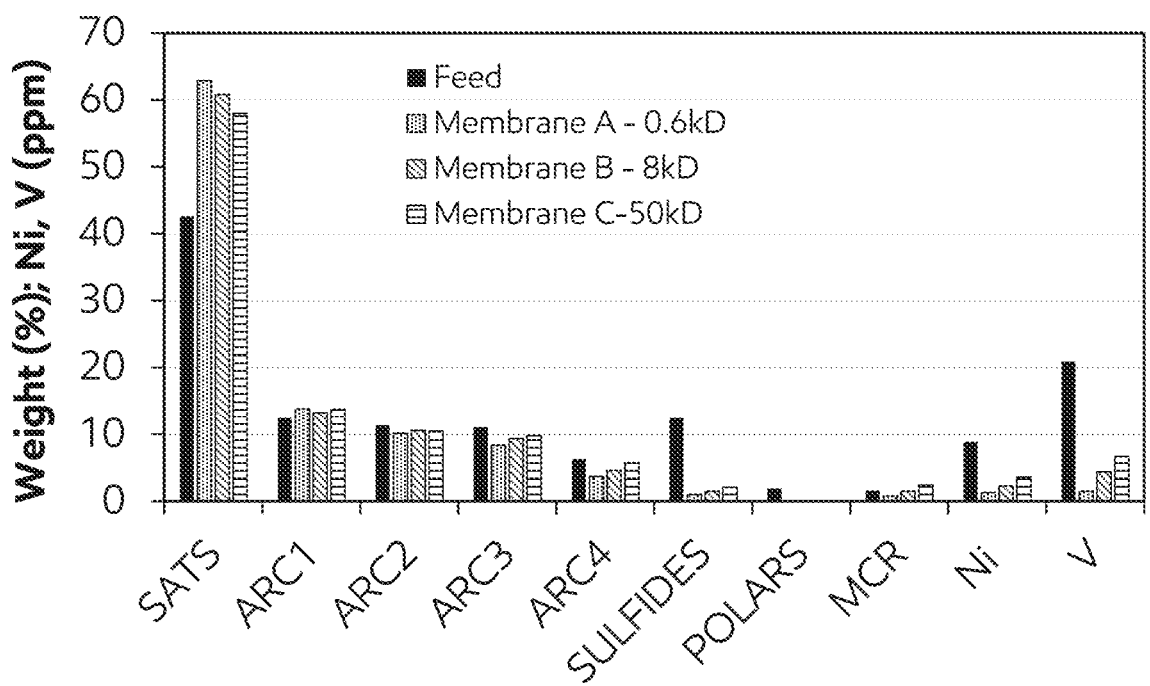
FIG. 10A graphically illustrates class analysis of permeate through different membranes as described in Example 5 at 0-25% yield.
Figure 10B:
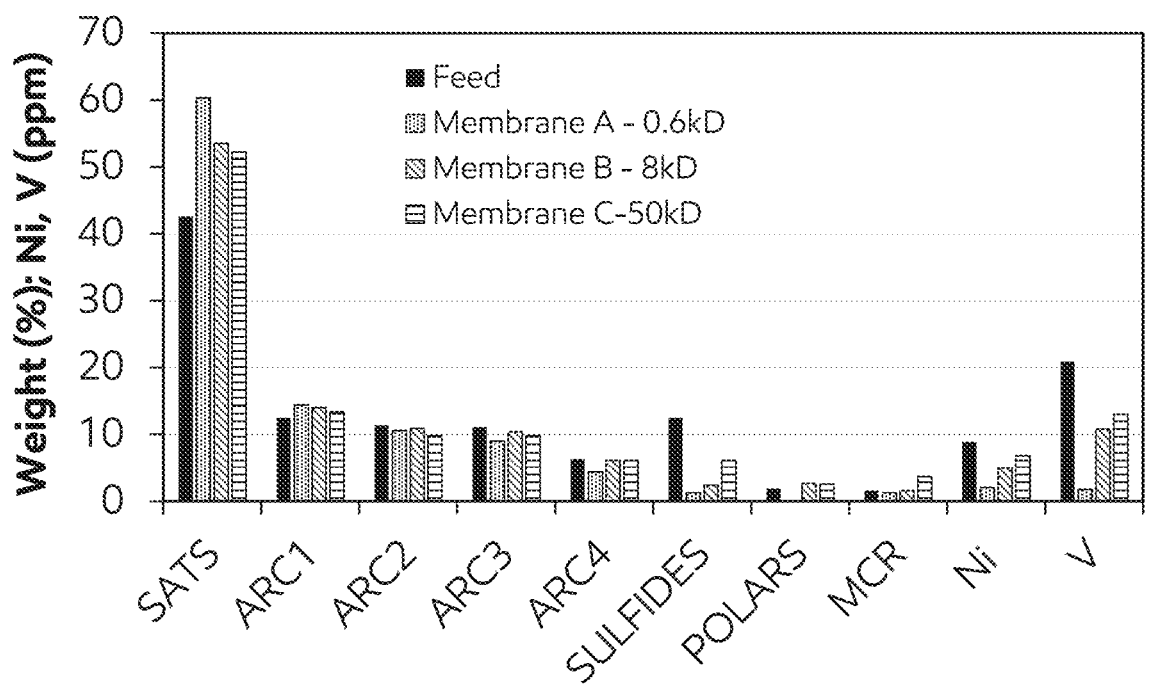
FIG. 10B graphically illustrates class analysis of permeate through different membranes as described in Example 5 at 25-50% yield.

FIGS. 10A and 10B provide analysis of the 25% and 25-50% permeate yields with respect to the feeds. It can be seen that the membranes separate based on the class and size of the molecules and not boiling point, even though the products fall into boiling point classes. The saturates, aromatic ring class ARC-1 weight fraction in the permeate is higher than the feed while the ARC-2,3,4, sulfides, polars, metals, MCR fraction is lower than the feed. As the molecules get larger in size and increased aromaticity the molecules tend to get rejected more. The trend that the tighter membrane with 0.6 kD MWCO shows a much higher rejection of ARC-2+ components with a higher enrichment of saturates and ARC-1 species. The yield-purity trend can also be observed with the 25% yield for 0.6 kD having higher saturates content and lower ARC-1+ components vs. the 50% yield.

Figure 11:
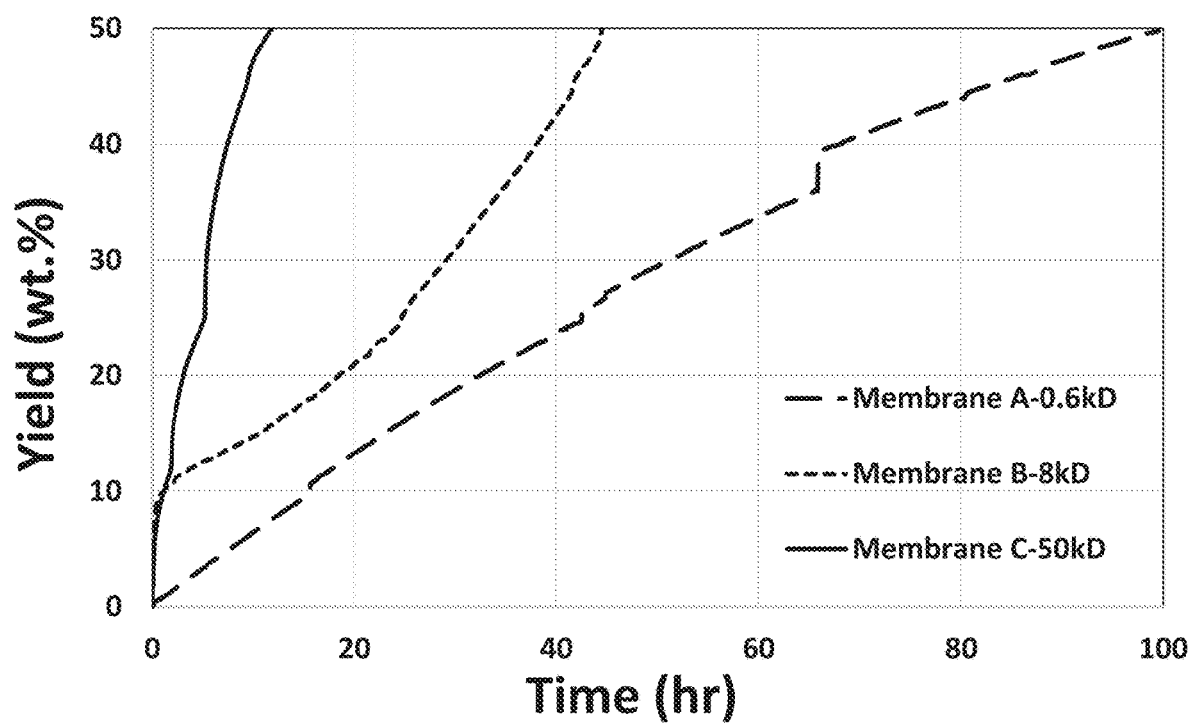
FIG. 11 shows permeate yield as a function of time through the different membranes described in Example 5.

As depicted in FIG. 11, which shows the yield (wt. %) as a function of time. It can be observed that the 0.6 kD membrane has a lower flux compared to the 8 kD and 50 kD membrane and thus requires roughly 10× longer to reach 50 wt. % yield vs. a 50 kD membrane. This also indicates that the membrane choice and the yield effects purity and process design.

Finally the 460° F.– (238° C.–) permeate from the first stage of the membrane cascade must be separated into naphtha and kerosene products. Naphtha range molecules are in the $C_5$-$C_{12}$ range molecules with the light naphtha consisting of $C_5$-$C_8$ range molecules with a boiling point ranging from 90-180° F. (~32-82° C.) and heavy naphtha consisting of $C_7$-$C_{12}$ range with a boiling point of roughly 180-380° F. (82-193° C.). While naphtha contains a mixture of paraffins, naphthenes and aromatic hydrocarbons; aromatic hydrocarbons tend to provide a higher octane number and are more desirable. Kerosene's major components are branched and straight chain alkanes and naphthenes (cycloalkanes), with smaller amounts of aromatic hydrocarbons in this boiling range, such as alkylbenzenes (single ring) and alkylnaphthalenes (double ring). Kerosene molecules are in the $C_{12-17}$ range with a boiling point in the 380-460° F. range. For simplicity, a separation of aromatics from linear paraffins can in effect be considered as the separation of naphtha and kerosene range molecules.

Example 6: Stage 4 of the Membrane Cascade Operating in Liquid Phase Reverse Osmosis Mode A 100 mL 98:1:1 wt. % mixture of m-xylene, n-octane and iso-octane was loaded into a batch membrane cell under constant stirring at 500 psig (~3.4 MPag) and 77° F. (25° C.). An asymmetric matrimid—commercially available polyimide (3,3',4,4'-benzophenonetetracarboxylic dianhydride and diaminophenylindane) membrane was used for the study. 5 wt. % permeate was collected and analyzed using a GC and found to show preferential permeation of m-xylene over n-octane with a separation factor of 1.37 and a preferential permeation of m-Xylene over iso-octane with a separation factor of 1.75. The separation factor is defined as the ratio of the weight fraction of aromatics and saturates in the permeate to that of the feed. This demonstrates the separation of aromatic and saturate molecules in a liquid phase reverse osmosis type mode.

Example 7—Stage 4 of the Membrane Cascade Operating in Pervaporation Mode

A cross-linked/esterified polyimide polyester copolymers membrane with a MWCO<200 Daltons was operated in a pervaporation modality. The membrane was operated at 150° C., with a feed pressure of 407 kPa and with a feed rate of 1 g/s in a cross flow mode. The permeate was kept under vacuum with the permeate side pressure being 2-20 kPa. The rate of permeate collection was roughly 0.02 g/s. The feed composition had a mix of paraffins and aromatic molecules suitable for a 460° F.– feed as highlighted in Table 11 below. The membrane displayed a solubility based selectivity showing a preference for aromatics/saturates with a separation factor of 5.76. The separation factor is defined as the ratio of the weight fraction of aromatics and saturates in the permeate to that of the feed. It can be hypothesized that the paraffinic and aromatic molecules in the 460° F.– range are similar in their diffusion characteristics due to similar size (as shown in FIG. 2A) and the separation performance is due to solubility (FIGS. 14A and 14B). Transport is by solution diffusion mechanism coupled with component vapor partial pressure driving force. GC analysis was used to characterize the feed and permeate streams. Aromatics are potentially absorbed the polymer membrane. Permeate vapors are condensed by cooling.

TABLE 11

|  | Feed (wt. %) | Permeate (wt. %) |
|---|---|---|
| N-OCTANE | 4.92 | 2.91 |
| OTHER C10 (isopar-G) | 37.06 | 8.25 |
| TOLUENE | 0.06 | 0.05 |
| ETHYLBENZENE | 10.19 | 15.84 |
| P + M-XYLENE | 38.49 | 59.25 |
| O-XYLENE | 9.04 | 13.33 |
| NAPHTHALENE | 0.25 | 0.38 |
| Total | 100 | 100 |
| % Aliphatic | 41.97 | 11.16 |
| % Aromatic | 58.03 | 88.84 |
| Separation Factor ($\{W_{aromatics}/W_{saturates}\}_{permeate}/\{W_{aromatics}/W_{saturates}\}_{feed}$) | 5.8 | |

Example 8—Method of Selecting MWCO for the Membrane to Achieve the Targeted Separation In the preceding examples we establish the separation of the crude into boiling point fractions based on size and shape of the molecules to mimic the distillation process. In this example, we establish the method of selecting the MWCO using a model based approach. As explained above, membrane separation is controlled by diffusion coefficient of the molecules which in turn mainly depends on the molecular size (MW) and molecular shape (radius). Using experimental data, we have built a quantitative structure-performance relationship to explain the molecular diffusion as a function of the molecular properties (MW and radius) and the MWCO of the membrane itself as shown in FIG. 12 and Equations 1 and 2 above.

As shown in FIG. 12, with tighter pore size, the model needs a steeper MW dependence to match experimental data for whole crude separation. Once we adjust MW and radius dependence for each membrane, we find that parameter "a" and "b" are inversely proportional to the MWCO of the membrane (Eqn. 2). The correlations can be used to select the MWCO of the membrane to for a new intended separation.

Figure 13A:
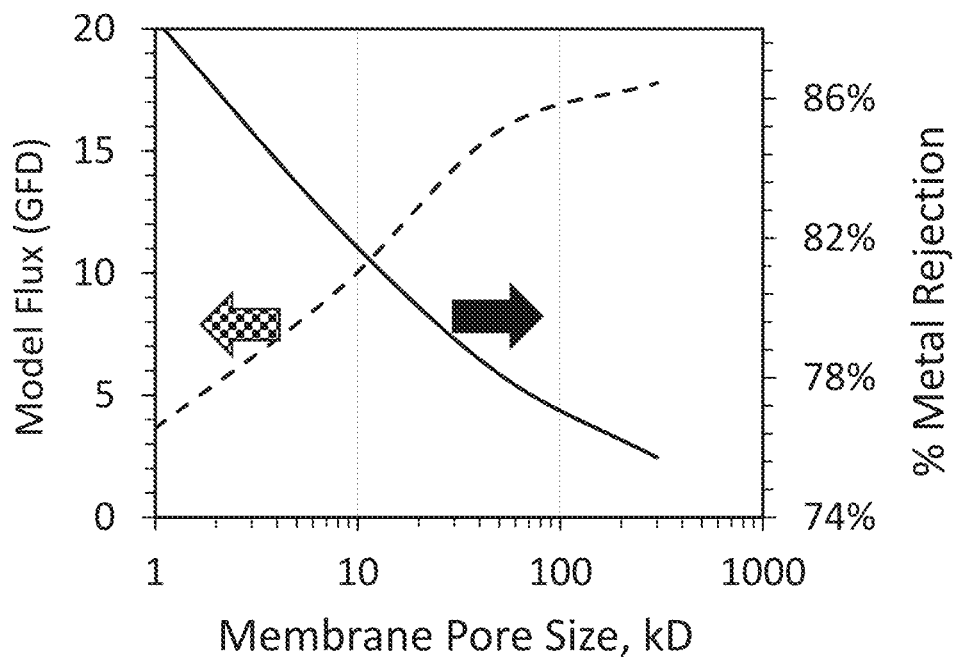
FIG. 13A shows relative diffusion as a function of the MW for five different membranes later described in Example 8.
Figure 13B:
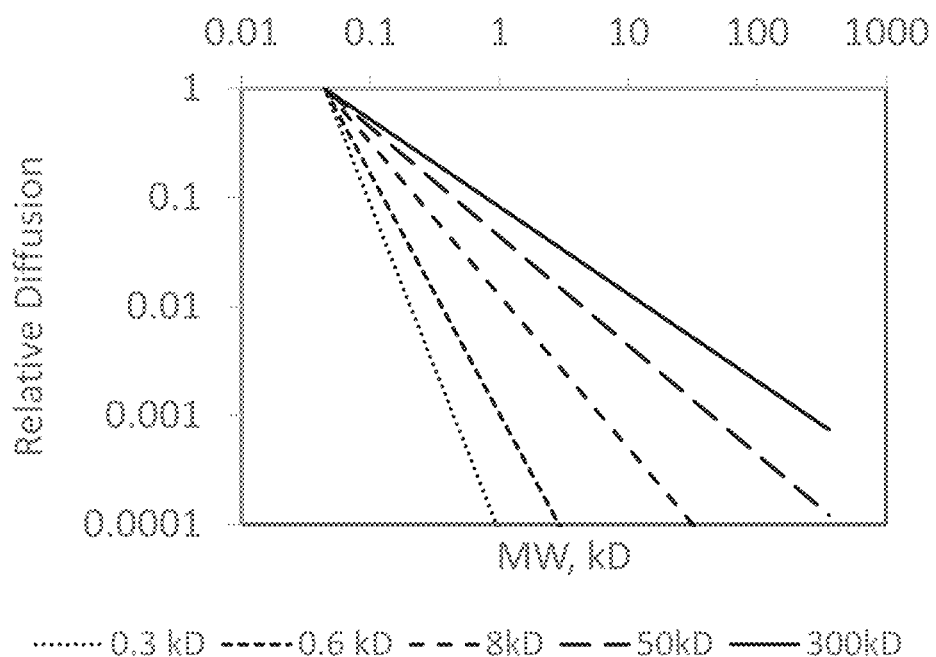
FIG. 13B shows the flux and selectivity trade-off as a function of the membrane pore size.

In FIGS. 13A and 13B, we show the example of selecting MWCO for a membrane for desired separation of the Stage 3 of the membrane cascade. For Stage 3 separation, the membrane is required to selectively permeate saturated molecules and reject metals such as Ni and V. This basically translates into achieving size based separation of saturates from aromatics in the 650° F.+ atmospheric tower bottoms driven by difference in molecular sizes. As shown in Example 5, there is a trade-off between selectivity and flux by comparison of the membrane pore sizes from 0.6 kD to 50 kD. In FIG. 13B, we show the flux and selectivity trade-off as a function of the membrane pore size based on the approach described above. In order to build this trade-off we describe various membranes with MWCO between 0.3 kD to 300 kD in terms of parameter "a" and "b" of Eqn. 1. Once we have description of the molecular diffusion, one can build the flux selectivity trade-off depicted in FIG. 13B. If the targeted separation to achieve flux of 10 GFD at maximum metal rejection, one would select 10 kD membrane for this application. Similarly, depending on feed (BP specification) and separation performance target we have selected optimum MWCO for each of the membrane stage described in previous examples.

Additional Embodiments

Embodiment 1

A process for fractionating a hydrocarbon stream into boiling point fractions, comprising: providing a hydrocarbon stream; selecting a first stage membrane effective to separate a hydrocarbon feed into a first stage permeate and a first stage retentate; wherein the heaviest molecule in the first stage permeate has a boiling point in the kerosene boiling range; selecting a second stage membrane effective to separate a hydrocarbon feed into a second stage permeate and a second stage retentate; wherein the heaviest molecule in the second stage permeate has a boiling point in the diesel boiling range; selecting a third stage membrane effective to separate a hydrocarbon feed a third stage permeate and a third stage retentate; wherein the heaviest molecule in the third stage permeate has a boiling point in the gas oil boiling range; selecting a fourth stage membrane effective to separate a hydrocarbon feed into a fourth stage permeate and a fourth stage retentate; wherein the heaviest molecule in the fourth stage permeate has a boiling point in the naphtha boiling range; and feeding the hydrocarbon stream to one of the first, second, third, or fourth stage membranes under effective separation conditions; feeding the applicable stage permeate and retentate to either a downstream refinery process or to another membrane stage; and repeating the preceding act until each of the first, second, third, and fourth stage membranes has performed a separation on the hydrocarbon stream, permeate from a previous membrane stage, or retentate from a previous membrane stage.

Embodiment 2

The process of embodiment 1, wherein the selecting a membrane for any of the stages comprises: obtaining compositional data of the hydrocarbon stream; said compositional data comprising one or more of API gravity, average molecular weight, aromaticity, average boiling point, density, total sulfur and nitrogen content, pour point, viscosity, metal content, total acid number (TAN), reid vapor pressure, Micro Carbon Residue content, C7 asphaltenes content, paraffin-naphthene-aromatic content, carbon to hydrogen ratio, and STAR-7 analysis; determining a desired diffusion of molecules through the membrane; selecting a membrane based on a relationship:

$$\text{Diffusion of molecules} \propto \frac{kT}{6\pi \, \text{viscosity} * \text{Radius}} \text{function (Radius, } MW\text{)}$$

where k is the Boltzmann constant, T is temperature for separation, viscosity is the viscosity of the feed, radius is the radius of each molecule in the feed, and MW is the molecular weight of each molecule in the feed; wherein determining the relationship comprises; obtaining a hydrocarbon feed of known composition; obtaining a membrane; performing a separation experiment by contacting the hydrocarbon feed of known composition with the membrane thereby forming a control permeate and a control retentate; analyzing the control permeate and the control retentate via one of simulated distillation, elemental analysis, and STAR7 analysis; and establishing at least one parameter unique to the membrane as an input to the function(Radius, MW).

Embodiment 3

The process of embodiment 2, wherein the relationship is based on the relationship:

$$\text{Diffusion of molecules} \propto \frac{kT}{6\pi \, \text{viscosity}} \left(\frac{1}{\text{Radius}}\right)^a \left(\frac{1}{MW}\right)^b \text{ or}$$

$$\text{Diffusion of molecules} \propto \frac{kT}{6\pi \, \text{viscosity} * \text{Radius}} \left(1 - \frac{\text{Radius}}{\text{PoreRadius}}\right)^a \left(\frac{1}{MW}\right)^b$$

wherein PoreRadius is the pore size of the membrane, wherein a and b are the parameters unique to the membrane and are established via the relationship a, b ∝ function (MWCO).

Embodiment 4

The process of embodiment 3, wherein function(MWCO) is $$\frac{1}{MWCO}.$$

Embodiment 5

The process of any of the previous embodiments, wherein the first stage membrane has a MWCO from about 100-500 Daltons.

Embodiment 6

The process of any of the previous embodiments, wherein the first stage membrane separates via a reverse osmosis modality, a nanofiltration modality, or a combination thereof.

Embodiment 7

The process of any of the previous embodiments, wherein the second stage membrane has a MWCO from about 500-2000 Daltons.

Embodiment 8

The process of any of the previous embodiments, wherein the second stage membrane separates via a nanofiltration modality, an ultrafiltration modality, or a combination thereof.

Embodiment 9

The process of any of the previous embodiments, wherein the third stage membrane has a MWCO from about 2-500 kDaltons, a pore size from 1.5-20 nm, or a combination thereof.

Embodiment 10

The process of any of the previous embodiments, wherein the third stage membrane has a MWCO from about 2-300 kDaltons.

Embodiment 11

The process of any of the previous embodiments, wherein the third stage membrane has a MWCO from about 2-50 kDaltons.

Embodiment 12

The process of any of the previous embodiments, wherein the third stage membrane separates via an ultrafiltration modality.

Embodiment 13

The process of any of the previous embodiments, wherein the fourth stage membrane has a MWCO of less than 200 Daltons, a pore size less than 1 nm, or a combination thereof.

Embodiment 14

The process of any of the previous embodiments, wherein the fourth stage membrane separates via a reverse osmosis or pervaporation modality.

Embodiment 15

The process of any of the previous embodiments, wherein the first stage membrane comprises perfluoropolymers.

Embodiment 16

The process of any of the previous embodiments, wherein the hydrocarbon stream is pushed through the first stage membrane at a permeate yield from about 5 wt. % to about 75 wt. % of the whole crude feed.

Embodiment 17

The process of any of the previous embodiments, wherein the hydrocarbon stream is pushed through the first stage membrane at a permeate yield of about 5 wt. %, about 10 wt. % or about 20 wt. % of the whole crude feed.

Embodiment 18

The process of any of the previous embodiments, wherein the first stage retentate is pushed through the second stage membrane at a permeate yield of about 5 wt. % to about 25 wt. % of the first stage retentate.

Embodiment 19

The process of any of the previous embodiments, wherein the second stage retentate is pushed through the third stage membrane at a permeate yield of about 5 wt. % to about 60 wt. % of the second stage retentate.

Embodiment 20

The process of any of the previous embodiments, wherein the first stage permeate is pushed through the fourth stage membrane at a permeate yield of about 5 wt. % to about 25 wt. % of the kerosene or naphtha boiling range permeate.

Embodiment 21

The process of any of the previous embodiments, wherein the hydrocarbon stream is whole crude, topped crude, bitumen, FCC main fractionator feed, coker fractionator feed, hydrocracker fractionator feed, visbreaker fractionator feed, or a combination thereof.

Embodiment 22

The process of any of the previous embodiments, wherein at least one of the membrane stages comprises a membrane cascade comprising more than one membrane.

Embodiment 23

The process of any of the previous embodiments, wherein the effective separation conditions comprise a temperature from 25° C.-300° C., feed pressure from 50-2000 psia, permeate pressure from 2-100 psia, and permeate yield from 5 wt. %-95 wt. %.

The present invention has been described above with reference to numerous embodiments and specific examples. Many variations will suggest themselves to those skilled in this art in light of the above detailed description. All such obvious variations are within the full intended scope of the appended claims.

The invention claimed is:

1. A process for fractionating a liquid hydrocarbon stream into boiling point fractions, comprising:

providing a liquid hydrocarbon stream;

selecting a first stage membrane effective to separate a liquid hydrocarbon feed into a first stage permeate and a first stage retentate; wherein the heaviest molecule in the first stage permeate has a boiling point in the kerosene boiling range;

selecting a second stage membrane effective to separate a liquid hydrocarbon feed into a second stage permeate and a second stage retentate; wherein the heaviest molecule in the second stage permeate has a boiling point in the diesel boiling range;

selecting a third stage membrane effective to separate a liquid hydrocarbon feed a third stage permeate and a third stage retentate; wherein the heaviest molecule in the third stage permeate has a boiling point in the gas oil boiling range;

selecting a fourth stage membrane effective to separate a liquid hydrocarbon feed into a fourth stage permeate and a fourth stage retentate; wherein the heaviest molecule in the fourth stage permeate has a boiling point in the naphtha boiling range; and feeding the liquid hydrocarbon stream to one of the first, second, third, and fourth stage membranes under effective separation conditions;

feeding the applicable stage permeate and retentate to either a downstream refinery process or to another membrane stage; and repeating the preceding act until each of the first, second, third, and fourth stage membranes has performed a separation on the liquid hydrocarbon stream, permeate from a previous membrane stage, or retentate from a previous membrane stage; and wherein the selecting a membrane for any of the stages comprises:

obtaining compositional data of the liquid hydrocarbon stream; said compositional data comprising one or more of API gravity, average molecular weight, aromaticity, average boiling point, density, total sulfur and nitrogen content, pour point, viscosity, metal content, total acid number (TAN), reid vapor pressure, Micro Carbon Residue content, C7 asphaltenes content, paraffin-naphthene-aromatic content, carbon to hydrogen ratio, and STAR-7 analysis;

determining a desired diffusion of molecules through the membrane;

selecting a membrane based on a relationship of diffusion of molecules through membrane based on temperature, viscosity of the feed, molecular weight and size/radius of molecules;

wherein determining the relationship comprises;

obtaining a liquid hydrocarbon feed of known composition;

obtaining a membrane;

performing a separation experiment by contacting the liquid hydrocarbon feed of known composition with the membrane thereby forming a control permeate and a control retentate;

analyzing the control permeate and the control retentate via one of simulated distillation, elemental analysis, and START analysis; and establishing at least one parameter unique to the membrane as an input to relationship of diffusion of molecules on temperature, viscosity, molecular weight and size/radius of molecules.

2. The process of claim 1, wherein the relationship of diffusion of molecules through the membrane is based on the relationship:

$$\text{Diffusion of molecules} \propto \frac{kT}{6\pi \text{ viscosity}} \left(\frac{1}{\text{Radius}}\right)^a \left(\frac{1}{MW}\right)^b \text{ or}$$

$$\text{Diffusion of molecules} \propto \frac{kT}{6\pi \text{ viscosity} * \text{Radius}} \left(1 - \frac{\text{Radius}}{\text{PoreRadius}}\right)^a \left(\frac{1}{MW}\right)^b$$

wherein PoreRadius is the pore size of the membrane, wherein a and b are the parameters unique to the membrane and are established via the relationship of a, b to Molecular Weight Cut Off (MWCO) of the membrane.

3. The process of claim 2, wherein the relationship of a, b to MWCO is $$\propto \frac{1}{MWCO}.$$

4. The process of claim 1, wherein the first stage membrane has a Molecular Weight Cut Off from about 100-500 Daltons.

5. The process of claim 1, wherein the first stage membrane separates via a reverse osmosis modality, a nanofiltration modality, or a combination thereof.

6. The process of claim 1, wherein the second stage membrane has a Molecular Weight Cut Off from about 500-2000 Daltons.

7. The process of claim 1, wherein the second stage membrane separates via a nanofiltration modality, an ultrafiltration modality, or a combination thereof.

8. The process of claim 1, wherein the third stage membrane has a Molecular Weight Cut Off from about 2-500 kDaltons, a pore size from 1.5-20 nm, or a combination thereof.

9. The process of claim 1, wherein the third stage membrane has a Molecular Weight Cut Off from about 2-300 kDaltons.

10. The process of claim 1, wherein the third stage membrane has a Molecular Weight Cut Off from about 2-50 kDaltons.

11. The process of claim 1, wherein the third stage membrane separates via an ultrafiltration modality.

12. The process of claim 1, wherein the fourth stage membrane has a Molecular Weight Cut Off of less than 200 Daltons, a pore size less than 1 nm, or a combination thereof.

13. The process of claim 1, wherein the fourth stage membrane separates via a reverse osmosis or pervaporation modality.

14. The process of claim 1, wherein the first stage membrane comprises perfluoropolymers.

15. The process of claim 1, wherein the liquid hydrocarbon stream is pushed through the first stage membrane at a permeate yield from about 5 wt. % to about 75 wt. % of a whole crude feed.

16. The process of claim 1, wherein the liquid hydrocarbon stream is pushed through the first stage membrane at a permeate yield of about 5 wt. %, about 10 wt. % or about 20 wt. % of a whole crude feed.

17. The process of claim 1, wherein the first stage retentate is pushed through the second stage membrane at a permeate yield of about 5 wt. % to about 25 wt. % of the first stage retentate.

18. The process of claim 1, wherein the second stage retentate is pushed through the third stage membrane at a permeate yield of about 5 wt. % to about 60 wt. % of the second stage retentate.

19. The process of claim 1, wherein the first stage permeate is pushed through the fourth stage membrane at a permeate yield of about 5 wt. % to about 25 wt. % of the kerosene or naphtha boiling range permeate.

20. The process of claim 1, wherein the liquid hydrocarbon stream is whole crude, bitumen, or a combination thereof.

21. The process of claim 1, wherein at least one of the membrane stages comprises a membrane cascade comprising more than one membrane.

22. The process of claim 1, wherein the effective separation conditions comprise a temperature from 25° C.-300° C., feed pressure from 50-2000 psia, permeate pressure from 2-100 psia, and permeate yield from 5 wt. %-95 wt. %.

* * * * *